United States Patent
Friesen

(10) Patent No.: US 9,858,724 B2
(45) Date of Patent: *Jan. 2, 2018

(54) AUGMENTED REALITY DESIGN SYSTEM

(71) Applicant: NIKE, Inc., Beaverton, OR (US)

(72) Inventor: David Y. Friesen, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,154

(22) Filed: Mar. 18, 2016

(65) Prior Publication Data

US 2016/0203647 A1  Jul. 14, 2016

Related U.S. Application Data

(63) Continuation of application No. 14/571,443, filed on Dec. 16, 2014, now Pat. No. 9,384,578, which is a (Continued)

(51) Int. Cl.

| | |
|---|---|
| G09G 5/00 | (2006.01) |
| G06T 19/00 | (2011.01) |
| G06T 11/60 | (2006.01) |
| G06F 3/01 | (2006.01) |
| G06F 17/50 | (2006.01) |
| A43B 3/00 | (2006.01) |
| G06F 3/0482 | (2013.01) |
| G06T 11/00 | (2006.01) |

(52) U.S. Cl.
CPC .......... *G06T 19/006* (2013.01); *A43B 3/0078* (2013.01); *G06F 3/011* (2013.01); *G06F 3/0482* (2013.01); *G06F 17/50* (2013.01); *G06T 11/001* (2013.01); *G06T 11/60* (2013.01); *G06F 2217/04* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 6,078,876 A | 6/2000 | Rosenberg et al. | |
| 6,753,828 B2 | 6/2004 | Tuceryan et al. | |
| (Continued) | | | |

FOREIGN PATENT DOCUMENTS

| | | |
|---|---|---|
| CN | 101059717 A | 10/2007 |
| DE | 20203367 U1 | 5/2003 |
| (Continued) | | |

OTHER PUBLICATIONS

Ahlers, et al., "An Augmented Vision System for Industrial Applications," SPIE Telemanipulator and Telepresence Technologies, 1994, vol. 2351, pp. 345-359.

(Continued)

*Primary Examiner* — Anh-Tuan V Nguyen
(74) *Attorney, Agent, or Firm* — Schwegman Lundberg & Woessner, P.A.

(57) ABSTRACT

An augmented reality design system is disclosed. The augmented reality design system allows a user to create a design for an article in real time using a proxy. The system can be configured using a head mounted display for displaying at least one virtual design element over a proxy located in a real-world environment. The system can also be configured using a projector that projects at least one virtual design element onto a proxy located in the real world.

18 Claims, 18 Drawing Sheets

Related U.S. Application Data continuation of application No. 12/709,636, filed on Feb. 22, 2010, now Pat. No. 8,947,455.

(56) References Cited

U.S. PATENT DOCUMENTS

| | | | |
|---|---|---|---|
| 6,842,175 B1 | 1/2005 | Schmalstieg et al. | |
| 6,968,075 B1* | 11/2005 | Chang | G06K 9/00214 382/111 |
| 7,079,114 B1 | 7/2006 | Smith et al. | |
| 7,110,909 B2 | 9/2006 | Friedrich et al. | |
| 7,397,481 B2 | 7/2008 | Endo et al. | |
| 7,511,703 B2* | 3/2009 | Wilson | G06F 3/0425 178/18.09 |
| 7,589,747 B2 | 9/2009 | Matsui et al. | |
| 8,180,114 B2 | 5/2012 | Nishihara et al. | |
| 8,947,455 B2 | 2/2015 | Friesen | |
| 9,384,578 B2 | 7/2016 | Friesen | |
| 2002/0105484 A1 | 8/2002 | Navab et al. | |
| 2003/0011590 A1* | 1/2003 | Kung | G06T 17/00 345/419 |
| 2003/0139896 A1 | 7/2003 | Dietz et al. | |
| 2004/0113885 A1 | 6/2004 | Genc et al. | |
| 2005/0052426 A1 | 3/2005 | Hagermoser et al. | |
| 2005/0154487 A1* | 7/2005 | Wang | A41H 3/007 700/132 |
| 2005/0174361 A1 | 8/2005 | Kobayashi et al. | |
| 2005/0285879 A1 | 12/2005 | Suzuki et al. | |
| 2006/0001645 A1 | 1/2006 | Drucker et al. | |
| 2006/0176242 A1 | 8/2006 | Jaramaz et al. | |
| 2006/0221098 A1 | 10/2006 | Matsui et al. | |
| 2006/0284791 A1 | 12/2006 | Chen et al. | |
| 2007/0201863 A1 | 8/2007 | Wilson et al. | |
| 2007/0247393 A1 | 10/2007 | Kuroki et al. | |
| 2007/0248261 A1 | 10/2007 | Zhou et al. | |
| 2008/0191864 A1 | 8/2008 | Wolfson | |
| 2008/0262944 A1* | 10/2008 | Wu | G06Q 30/0603 705/27.2 |
| 2008/0267450 A1 | 10/2008 | Sugimoto et al. | |
| 2009/0051758 A1* | 2/2009 | Endo | G06F 3/011 348/53 |
| 2009/0073162 A1 | 3/2009 | Waatti et al. | |
| 2009/0109214 A1 | 4/2009 | Harvill et al. | |
| 2009/0124379 A1 | 5/2009 | Wells | |
| 2009/0128564 A1 | 5/2009 | Okuno | |
| 2009/0222127 A1 | 9/2009 | Lind et al. | |
| 2009/0225030 A1 | 9/2009 | Vaananen et al. | |
| 2010/0036753 A1 | 2/2010 | Harvill et al. | |
| 2010/0160041 A1 | 6/2010 | Grant et al. | |
| 2010/0176825 A1 | 7/2010 | Kim et al. | |
| 2010/0199232 A1 | 8/2010 | Mistry et al. | |
| 2010/0283745 A1 | 11/2010 | Nikolovski et al. | |
| 2011/0029903 A1* | 2/2011 | Schooleman | G06F 3/011 715/764 |
| 2011/0040539 A1* | 2/2011 | Szymczyk | G06Q 30/0603 703/6 |
| 2011/0154233 A1* | 6/2011 | Lamarca | G06F 3/0425 715/764 |

FOREIGN PATENT DOCUMENTS

| | | |
|---|---|---|
| JE | 2006048484 A | 2/2006 |
| JP | 2005107971 A | 4/2005 |
| JP | 2007293413 A | 11/2007 |
| JP | 2008085641 A | 4/2008 |
| WO | WO-2011103272 A2 | 8/2011 |

OTHER PUBLICATIONS

Bandyopadhyay, et al., "Dynamic Shader Lamps: Painting on Movable Objects," Augmented Reality, 2001, pp. 207-216.
Chinese Office Action for Chinese Application No. 201180020353. 2, mailed on Jun. 3, 2015.
Decision of rejection mailed Dec. 2, 2014 for Japanese Patent Application No. 2012554019.
Fiorentino, et al., "Spacedesign: A Mixed Reality Workspace for Aesthetic Industrial Design," IEEE International Symposium on Mixed and Augmented Reality, 2002.
First Office Action in Chinese Patent Application No. 201180020353.2 dated Dec. 29, 2014.
Grasset R., et al., "Interactive Mediated Reality," ACS 6th Australasian User Interface Conference, 2005, vol. 40, pp. 21-29.
International Preliminary Report on Patentability and Written Opinion for Application No. PCT/US2011/025211, mailed Sep. 7, 2012.
International Search Report and Written Opinion for Application No. PCT/US2011/025211, mailed May 27, 2011.
Kato H., et al., "Virtual Object Manipulation on a Table-Top AR Environment," IEEE, 2000, pp. 111-119.
Notice of Appeal as mailed Apr. 1, 2015 for Japanese Patent Application No. 2012-554019, and the English Translation thereof.
Office Action dated Jan. 21 2014 in JP Patent Application No. 2012-554019.
Office Action mailed Nov. 5, 2015 for Chinese Patent Application No. 2011800203532.
Response filed May 13, 2015 for Chinese Patent Application No. 201180020353.2.
Response filed Jul. 18, 2014 for Japanese patent Application No. 2012554019.
Response to Office Action filed Oct. 19, 2015 for Chinese Patent Application No. 201180020353.2, and the English translation thereof.
Verlinden, et al., "Investigation on the Use of Illuminated Clay in Automotive Styling," 6th International Conference on Computer-Aided Industrial Design and Conceptual Design, 2005, pp. 514-519.
"U.S. Appl. No. 12/709,636, Advisory Action dated Sep. 5, 2013", 4 pgs.
"U.S. Appl. No. 12/709,636, Examiner Interview Summary dated Feb. 6, 2014", 3 pgs.
"U.S. Appl. No. 12/709,636, Examiner Interview Summary dated Apr. 29, 2014", 3 pgs.
"U.S. Appl. No. 12/709,636, Examiner Interview Summary dated May 17, 2013", 3 pgs.
"U.S. Appl. No. 12/709,636, Final Office Action dated Mar. 7, 2014", 43 pgs.
"U.S. Appl. No. 12/709,636, Final Office Action dated May 30, 2013", 34 pgs.
"U.S. Appl. No. 12/709,636, Non Final Office Action dated Feb. 19, 2013", 33 pgs.
"U.S. Appl. No. 12/709,636, Non Final Office Action dated Nov. 21, 2013", 36 pgs.
"U.S. Appl. No. 12/709,636, Notice of Allowance dated Sep. 26, 2014", 19 pgs.
"U.S. Appl. No. 12/709,636, Response filed Feb. 10, 2014 to Non Final Office Action dated Nov. 21, 2013", 26 pgs.
"U.S. Appl. No. 12/709,636, Response filed May 20, 2013 to Non Final Office Action dated Feb. 19, 2013", 18 pgs.
"U.S. Appl. No. 12/709,636, Response filed Jun. 9, 2014 to Final Office Action dated Mar. 7, 2014", 33 pgs.
"U.S. Appl. No. 12/709,636, Response filed Jul. 25, 2013 to Final Office Action dated May 30, 2013", 22 pgs.
"U.S. Appl. No. 14/571,443, Examiner Interview Summary dated Aug. 3, 2015", 3 pgs.
"U.S. Appl. No. 14/571,443, Non Final Office Action dated Jun. 5, 2015", 23 pgs.
"U.S. Appl. No. 14/571,443, Notice of Allowance dated Dec. 10, 2015", 10 pgs.
"U.S. Appl. No. 14/571,443, Notice of Allowance dated Dec. 28, 2015", 2 pgs.
"U.S. Appl. No. 14/571,443, Notice of Non Compliant Amendment dated Sep. 18, 2015", 2 pgs.
"U.S. Appl. No. 14/571,443, Preliminary Amendment filed Dec. 16, 2014", 12 pgs.
"U.S. Appl. No. 14/571,443, Response filed Sep. 8, 2015 to Non Final Office Action dated Jun. 5, 2015", 14 pgs.
"U.S. Appl. No. 14/571,443, Response filed Sep. 28, 2015 to Notice of Non Compliant Amendment dated Sep. 18, 2015", 10 pgs.
"Chinese Application Serial No, 201180020353.2, Office Action dated May 4, 2016", with English Translation, 42 pgs.

"Japanese Application Serial No. 2015-75468, Amendment filed Apr. 2, 2015", with English translation of claims, 20 pgs.

"Japanese Application Serial No. 2015-75468, Voluntary Amendment filed Apr. 30, 2015", with English translation, 10 pgs.

"Chinese Application Serial No. 201180020353.2, Notice of Allowance dated Jan. 31, 2017", with English translation, 5 pgs.

"Chinese Application Serial No. 201180020353.2, Notice of Termination of Reexamination Procedure mailed Sep. 2, 2016", with English translation of claims, 11 pgs.

"Chinese Application Serial No. 201180020353.2, Request for Reexamination filed Aug. 4, 2016", with English translation of claims, 65 pgs.

"Chinese Application Serial No. 201180020353.2, Notice of Allowance dated Sep. 20, 2016", with English translation, 5 pgs.

"Chinese Application Serial No. 201180020353.2, Response filed Jan. 19, 2016 to Office Action dated Nov. 5, 2015", with English translation, 4 pgs.

"Japanese Application Serial No. 2016-125278, Office Action dated Sep. 11, 2017", w/ English Translation, 11 pgs.

"Japanese Application Serial No. 2016-125279, Office Action dated Sep. 11, 2017", w/ English translation, 16 pgs.

Katsunori, Miyahara, et al., "A Cloth Design System Using Hepatic Device and Its Collaborative Environment", the 15th Workshop on Interactive Systems and Software (WISS2007), (2007), 2-4.

Kazuhiro, Matsushita, et al., "Bookshelf management support though projection-based mixed reality and bookshelf log", The 14th Annual Conference of the Virtual Reality Society of Japan, Collection of literature [DVD-ROM], The Virtual Reality Society of Japan, (Sep. 9, 2009), 2-5.

* cited by examiner

AUGMENTED REALITY DESIGN SYSTEM

CROSS-REFERENCE TO RELATED APPLICATIONS

This application is a continuation of Friesen, U.S. application Ser. No. 14/571,443, entitled "Augmented Reality Design System", filed on Dec. 16, 2014, and published as U.S. Patent Publication number 2015/0109322, which is a continuation of Friesen, U.S. application Ser. No. 12/709,636, entitled "Augmented Reality Design System", filed on Feb. 22, 2010, published as U.S. Patent Publication Number 2011/0205242, and now U.S. Pat. No. 8,947,455, both of which are hereby incorporated by reference in their entireties.

BACKGROUND

The present invention relates generally to a design system and in particular to an augmented reality design system for use in designing articles.

Augmented reality systems have been previously proposed. Kobayashi et al. (U.S. patent application publication number 2005/0174361) teaches an image processing method and apparatus. Kobayashi teaches a position and orientation stylus for use in a mixed reality system. The stylus is used to orient a virtual object with respect to a real model. Kobayashi teaches that a user may use the stylus to touch the real model. The system is then able to determine the position and orientation of the real object and align the virtual object accordingly.

German patent number 20203367 teaches a system for early visualization of a vehicle design model in three dimensional form. The device generates a set of data for a vehicle or part of a vehicle. Another device generates a virtual reality model using the data set to be stored in memory. A control device overlays a real model of a vehicle with the virtual reality model using augmented reality. A projection device in the form of a monitor depicts the vehicle model.

The related art lacks provisions for efficiently designing an article in real time using an augmented reality system.

SUMMARY

In one aspect, the invention provides a method of designing an article, comprising the steps of: viewing a proxy on a display device, the proxy existing in a real-world environment; contacting the proxy with an interacting device to create a virtual design for the article; and where the virtual design is displayed on the display device so as to appear to be a part of the proxy.

In another aspect, the invention provides a method of designing an article, comprising the steps of: contacting a portion of a proxy with an interacting device to create a virtual design for the article; projecting the virtual design onto the proxy; and where the virtual design is projected onto the proxy so as to appear to be a part of the proxy.

In another aspect, the invention provides a method of designing an article, comprising the steps of: viewing a proxy on a display device, the proxy existing in a real-world environment and where a portion of the proxy has a first color; contacting the portion of the proxy with an interacting device; and thereby modifying the apparent color of the proxy as seen on the display device so that the color of the portion is changed from the first color to a second color that is different from the first color.

In another aspect, the invention provides a method of designing an article, comprising the steps of: selecting a color from a virtual color palette associated with a proxy, the proxy existing in a real-world environment and where a portion of the proxy has a first color; contacting the portion of a proxy with an interacting device; projecting a second color onto the portion of the proxy substantially immediately after the interacting device has contacted the portion; and thereby changing the apparent color of the portion.

In another aspect, the invention provides a method of designing an article, comprising the steps of: viewing a proxy on a display device, the proxy existing in a real-world environment; contacting the proxy with an interacting device; displaying the virtual line on the display device substantially immediately after contacting the proxy with the interacting device; and where the virtual line is displayed on the display device so as to appear to be a part of the proxy.

In another aspect, the invention provides a method of designing an article, comprising the steps of: contacting a proxy with an interacting device; projecting a virtual line onto the proxy substantially immediately after the interacting device has contacted the proxy; and where the virtual line is projected onto the proxy so as to appear to be a part of the proxy.

In another aspect, the invention provides an augmented reality design system, comprising: an imaging device for receiving images from a real-world environment; an interacting device for interacting with a proxy in the real world environment; a computing device capable of generating virtual images; a display device for viewing at least one virtual image superimposed onto the proxy; a virtual menu that may be displayed on the display device, where the virtual menu is associated with a location in the real world environment and where a user can interact with the virtual menu by placing the interacting device in the location; and where the virtual menu can be used to apply a virtual design element to the proxy.

In another aspect, the invention provides an augmented reality design system, comprising: an imaging device for receiving images from a real-world environment; an interacting device for interacting with a proxy in the real world environment; a computing device capable of generating virtual images; a projecting device for projecting at least one virtual image onto the proxy; a virtual menu that may be projected onto a location in the real-world environment and where a user can interact with the virtual menu by placing the interacting device in the location; and where the virtual menu can be used to apply a virtual design element to the proxy.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
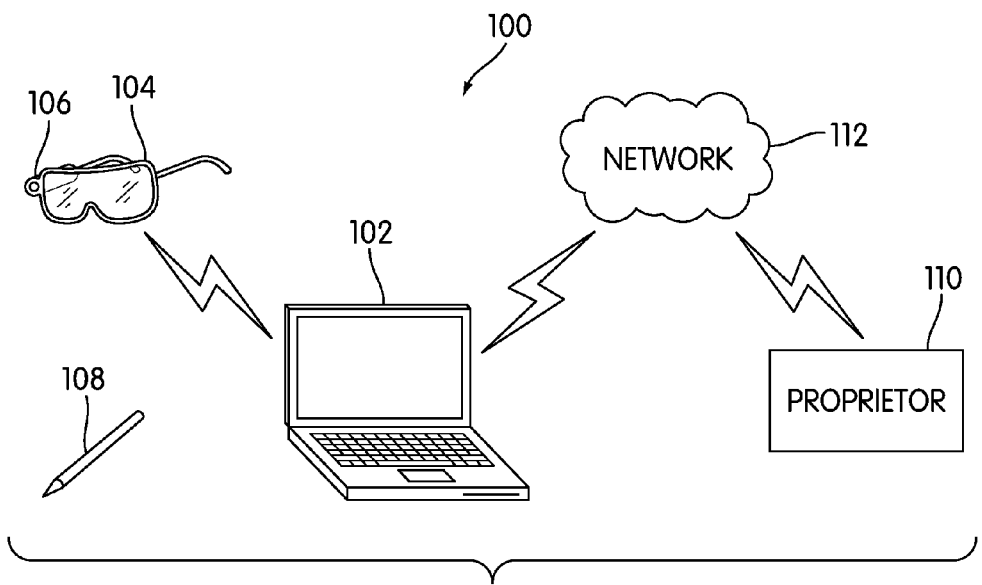
FIG. 1 is a schematic view of an embodiment of a design system.

FIG. 1 illustrates an embodiment of augmented reality design system 100, also referred to simply as system 100. The term "augmented reality design system" as used throughout this detailed description and in the claims refers to any system that may be used to design one or more articles or objects using a combination of real-world views that are merged with computer generated images. For purposes of clarity, the terms "real" and "virtual" are used throughout this detailed description and in the claims to distinguish between various types of images and/or objects. For example, a real-world view or real-world image refers to any view or image of a real environment that is occupied by a user. In contrast, a virtual image or virtual object is any image or object that is generated by a computing device and which is associated with a virtual environment. Moreover, for purposes of clarity, the term "virtual design element" is used throughout this detailed description and in the claims to refer collectively to any type of virtual object, virtual image or virtual graphic that may be created by, or used with, a design system. The combination of virtual images or objects with a real-world view or image comprises a view or image that is associated an augmented reality environment.

System 100 can include one or more components. In one embodiment, system 100 may include computing device 102. Computing device 102 may be any type of computer, including either a desktop or a laptop computer. In other embodiments, computing device 102 may be any type of device that includes a display, a processor, and the ability to transmit and receive data from one or more external sources. Examples of such devices include, but are not limited to: PDA's, cell phones, as well as other types of devices.

System 100 can include provisions for displaying an augmented reality image for a user. In some embodiments, system 100 can include display device 104. Display device 104 can be any type of display including, but not limited to: a computer screen or monitor, a head mounted unit, a projection based display as well as any other kind of display. In the current embodiment, display device 104 may comprise a head mounted unit, or head mounted display (HMD). In particular, in the current embodiment, display device 104 comprises a pair of goggles. As a user looks through display device 104, one or more virtual images can be displayed over the real-world view as seen through display device 104. Head mounted displays for use in augmented reality systems are known. Examples may be found in U.S. Pat. Nos. 2006/02484791 7,397,481 and 7,110,909, the entirety of both being hereby incorporated by reference.

System 100 can include provisions for capturing optical information. In some embodiments, system 100 can include imaging device 106. Imaging device 106 can be any device capable of sensing optical information. In some cases, imaging device 106 can be a camera. In some cases, imaging device 106 may be a video camera of some kind. Examples of different types of video cameras that could be used include charge coupled device (CCD) cameras, complementary metal-oxide-semiconductor (CMOS) cameras, other types of active pixel sensor cameras as well as any other type of video cameras.

Generally, imaging device 106 can be disposed in any location with respect to various components of system 100. In some cases, imaging device 106 can be stationary. In other cases, imaging device 106 can be mounted to another component of system 100. In an exemplary embodiment, imaging device 106 may be mounted to a portion of display device 104. With this arrangement, imaging device 106 may be configured to receive optical information that may also be perceived by a user of system 100 as they look around. In other words, using this arrangement, imaging device 106 may have a substantially similar view of the real-world environment as a user. In other embodiments, imaging device 106 may be disposed in another location in which the approximate viewpoint of a user may be captured.

System 100 can include provisions for interacting with an augmented reality environment. In some cases, system 100 can include interacting device 108. Interacting device 108 may take any form. In some cases, interacting device 108 could comprise a stylus. For example, interacting device 108 could comprise a stylus similar to the kind used with personal digital assistants (PDAs), in which the stylus is a substantially monolithic component that is used for applying pressure to a display. In the current embodiment, interacting device 108 is a substantially monolithic component with the approximate shape of a pen. In other cases, however, interacting device 108 could have any other shape, size and composition.

In some embodiments, one or more components of system 100 may communicate with computing device 102. In some cases, imaging device 106 may communicate with computing device 102. Additionally, in some cases, display device 104 may communicate with computing device 102. Imaging device 106 and display device 104 could communicate with computing device 102 using any type of wireless and/or wired connections. In some cases, imaging device 106 and display device 104 can communicate with computing device 102 using a network of some kind. Examples of such networks include, but are not limited to: personal area networks, local area networks, wide area networks, client-server networks, peer-to-peer networks, as well as other types of networks. In some cases, a wireless local or personal area network using the Bluetooth® protocol is used to facilitate communication between computing device 102 and imaging device 106 and/or display device 104. With this arrangement, images gathered from imaging device 106 can be received by computing device 102 and combined with virtual information. The combined information can then be transmitted back to display device 104 to be displayed for a user. In particular, this allows system 100 to augment the view of a user with one or more virtual objects or images.

Although the current embodiment uses a single imaging device, other embodiments could include two or more imaging devices. Moreover, it will be understood that in other embodiments any other kinds of sensors could be used with system 100. An example of a system using additional kinds of sensors is discussed in detail below.

Although computing device 102 is shown as a stand-alone computer in the current embodiment, in other embodiments, computing device 102 could be integrated with other components of system 100. For example, in another embodiment, computing device 102 could be integrated with display device 104. In particular, display device 104 could include provisions for processing optical information received by imaging device 106 as well as for generating virtual images to be displayed in display device 104. In still other embodiments, computing device 102 could be integrated with any other components of system 100. In another example, computing device 102 could be a portable device that may be worn or carried by a user to enhance the portability of system 100. Furthermore, in some embodiments, computing device 102 may not be located near various components of system 100. For example, in another embodiment, imaging device 106 and display device 104 may communicate remotely with computing device 102 using a network as discussed above. Such an arrangement may increase the portability of system 100, especially of imaging device 106 and display device 104.

System 100 can include provisions for communicating with proprietor 110. Proprietor 110 may include one or more factories, multiple offices, retailers and various other establishments associated with a business. Generally, the term "proprietor," as used throughout this detailed description and in the claims, may also refer to distributors and/or suppliers. In other words, the term proprietor may also apply to various operations on the manufacturing side, including the operations responsible for parts, labor, and/or retail of the article of footwear, as well as other manufacturing side operations. With this arrangement, a design created using system 100 can be submitted to proprietor 110 for purposes of manufacturing retail items using the design.

Computing device 102 and proprietor 110 can communicate using network 112. Generally, network 112 can be any type of network including any of the networks discussed above. In some embodiments, network 112 may be a packet-switched communications system. In an exemplary embodiment, network 112 may be the Internet. Moreover, it should be understood that in some cases, system 100 may be operated directly by proprietor 110.

Figure 2:
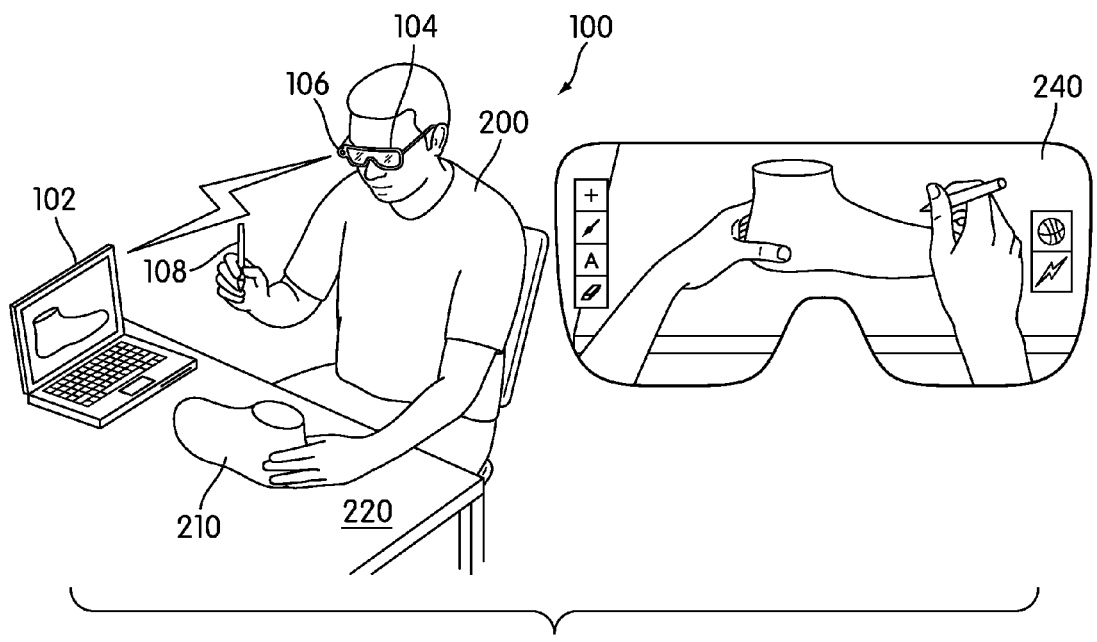
FIG. 2 is an isometric view of an embodiment of the design system in use.

FIG. 2 illustrates an embodiment of augmented reality design system 100 being operated by user 200. Generally, user 200 can be anyone capable of operating system 100. In some cases, user 200 may be a professional designer of some kind. For example, in one embodiment, user 200 may be a designer that works for proprietor 110. In other cases, however, user 200 may be a customer who intends to purchase merchandise that is designed using system 100. In still other cases, user 200 could be anyone capable of operating system 100.

System 100 can be used with proxy 210. Proxy 210 may be configured in the general shape of an article of some kind. Proxy 210 could be associated with any type of article including, but not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment. Additionally, in some embodiments, the article could be another type of article that is not configured to be worn, including, but not limited to: balls, bags, purses, backpacks, as well as other articles that may not be worn.

In the current embodiment, proxy 210 may be configured in the shape of an article of footwear. In one embodiment, proxy 210 may have the shape of a footwear last that is used for forming a shoe. In another embodiment, proxy 210 could have the shape of an article of footwear. In some cases, proxy 210 could have the shape of a specific type of footwear including, but not limited to: running footwear, cross training footwear, basketball footwear, soccer footwear, football footwear, high heel footwear, boots, slip-on footwear, low top footwear, sandals, as well as other types of footwear. In still other embodiments, proxy 210 could have any other shape.

In the current embodiment, proxy 210 may be blank without any markings. However, in other embodiments, to facilitate designing an article, proxy 210 could include various types of markings that indicate the approximate locations of various footwear features. For example, in one embodiment, proxy 210 could include a marking indicating the general location of the lacing region of an article, including, in some cases, markings indicating laces of some kind. As another example, proxy 210 could have markings that distinguish a sole of the footwear from an upper of the footwear. In some cases, providing additional markings may allow a designer to adapt the design to various different features of the footwear. Furthermore, it will be understood that in some cases these markings could be physically provided on proxy 210 and in other cases such markings could be applied virtually using system 100.

System 100 may be adapted for use in various design environments including any offices, factories or any other kind of location. For example, in the current embodiment, proxy 210 may be disposed on workbench 220. In other cases, however, proxy 210 could be disposed on a stand of some kind.

The operation of system 100 includes receiving a real-world view at imaging device 106. In particular, as a user looks at proxy 210, imaging device 106 captures an image of proxy 210 as well as the surrounding environment. System 100 may be configured with visual tracking software that is capable of precisely determining the location and orientation of proxy 210. Various types of visual tracking software are known in the art. This information may then be transmitted to computing device 102. At this point, computing device 102 may combine virtual objects or virtual images with images of the real-world environment. In particular, computing device 102 may be configured to display virtual objects or virtual images at display device 104, so that user 200 sees an augmented image including both real-world images and virtual images. Moreover, as previously discussed, imaging device 106 may be used to track the motion of interacting device 108. With this arrangement, user 200 may be able to manipulate one or more virtual images using interacting device 108.

For purposes of understanding the embodiments, images seen by a user through display device 104 are illustrated schematically in many of the Figures. For example, in the current embodiment, user 200 may see the real-world environment including proxy 210 through screen 240 of display device 104. In particular, in the current embodiment, screen 240 is a transparent screen through which user 200 may view the real world environment. Furthermore, virtual images may be displayed on screen 240 as discussed in detail below.

As previously discussed, system 100 can be utilized for purposes of designing an article of some kind. In the current embodiment, system 100 may be used to design various types of footwear. For example, system 100 may be used to apply various types of graphics including, but not limited to: lines, shapes, pictures, images, text, numbers, indicia as well as any other kind of graphics to a design for an article. System 100 can also be used to modify the colors, textures, materials or any other features of an article that may be incorporated into the design of an article.

Figure 3:
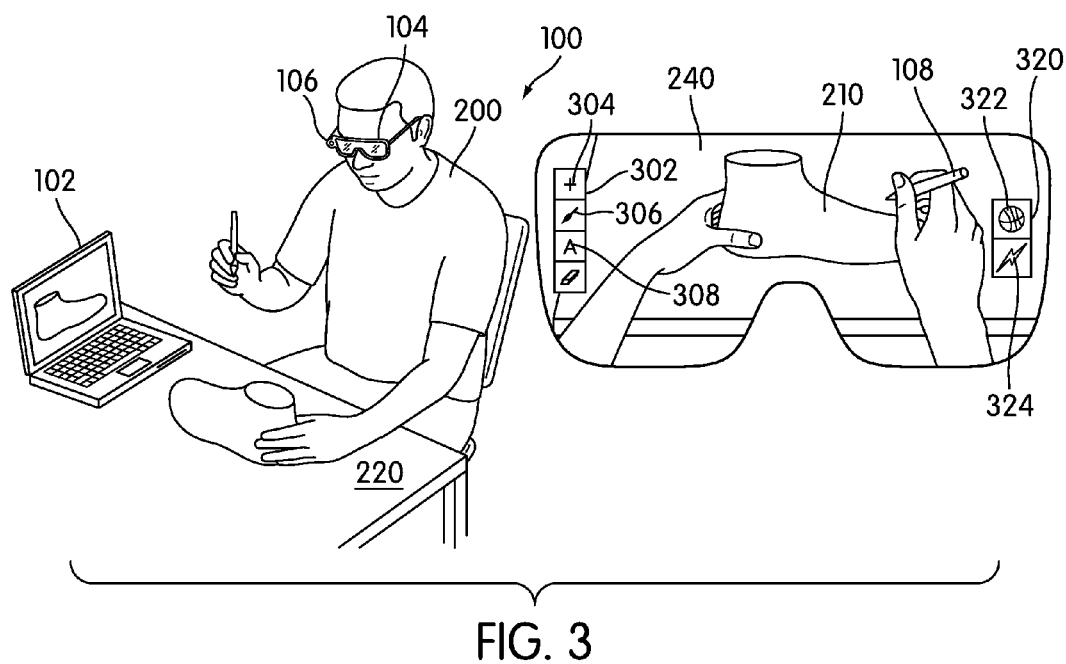
FIG. 3 is an isometric view of an embodiment of a set of design menus for the design system.

Referring to FIG. 3, system 100 may include provisions for assisting user 200 in applying a design to proxy 210. In some cases, system 100 can provide one or more design menus. A design menu may be a virtual menu that is displayed on display device 104. Design menus can include tool menus, color menus, graphics menus as well as any other kind of menus. Design menus make take the form of boxes, palettes, lists, or any other configuration.

In the current embodiment, system 100 includes tool palette 302. In some cases, tool palette 302 may be a virtual palette that is displayed on display device 104. Moreover, tool palette 302 may be displayed in a manner so that tool palette 302 appears to be disposed adjacent to proxy 210.

In different embodiments, the types of tools available within tool palette 302 can vary. In this case, tool palette 302 includes selection tool 304 that can be used for selecting portions of proxy 210 or portions of a virtual image associated with proxy 210. In addition, tool palette 302 can include drawing tool 306 that may be used to draw virtual lines on proxy 210. Additionally, tool palette 302 can include letter tool 308 that may be used to apply letters and words to portions of proxy 210. It will be understood that these tools are only intended to be exemplary and in other embodiments any other types of tools typically associated with graphic editing software could be used.

System 100 can also include graphics menu 320. Graphics menu 320 may include a set of predesigned graphics. For example, in the current embodiment, graphics menu 320 includes first graphic 322 and second graphic 324. For purposes of clarity, only two graphics are shown. However, in other embodiments, any other number of graphics could be included.

In some embodiments, system 100 can include provisions for allowing a user to import various designs or graphics from outside sources. In some embodiments, a user may attach various media devices to computing device 102 in order to import various graphics or designs to system 100. In some embodiments, a user may upload pictures, images and/or photos from a digital camera, a scanner, or any other device. Furthermore, in some cases, various types of designs or design elements may be gathered from other sources including the Internet.

Figure 4:
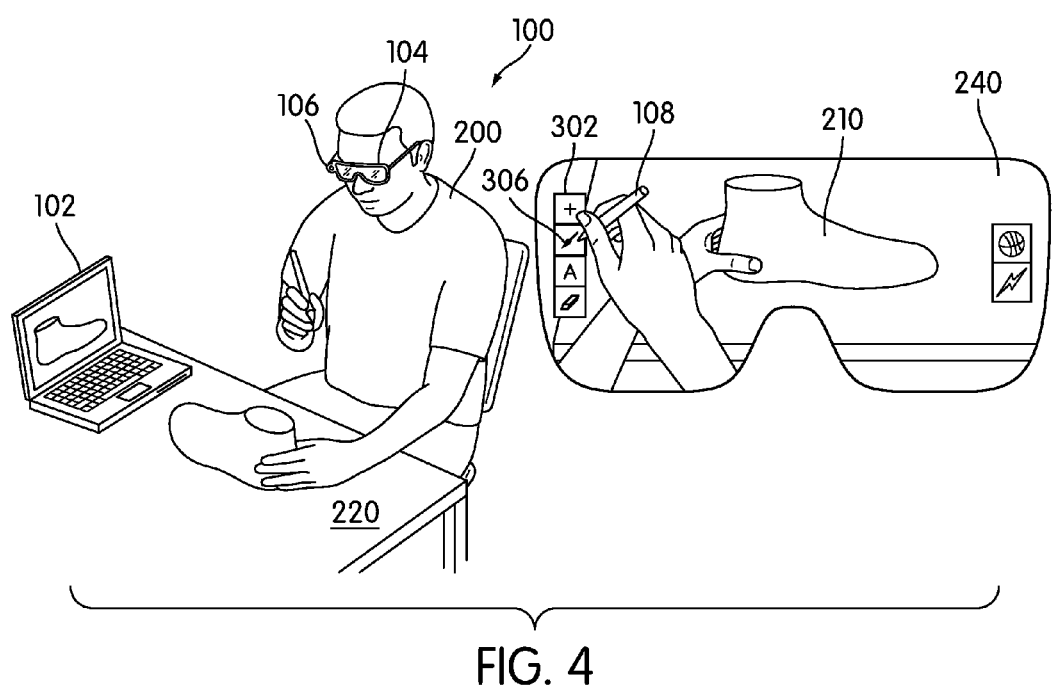
FIG. 4 is an isometric view of an embodiment of a drawing tool being selected by a user.

FIGS. 4 through 13 are intended to illustrate the operation of an embodiment of system 100. Referring to FIG. 4, user 200 may use interacting device 108 to select drawing tool 306. In particular, user 200 may move interacting device 108 so that stylus 108 intersects tool palette 302. In this case, tool palette 302 is a virtual palette that does not correspond to any object in the real-world environment. However, system 100 may track the position of interacting device 108 and may associate tool palette 302 with a real-world position that is adjacent to proxy 210. Then, as interacting device 108 moves into the real-world position associated with tool palette 302, system 100 may recognize an interaction between tool palette 302 and interacting device 108. In particular, in this case, system 100 may recognize that a user has intended to select drawing tool 306. With this arrangement, interacting device 108 may now function as a drawing device such as a brush, pen or pencil that can create virtual lines or strokes on proxy 210.

Figure 5:
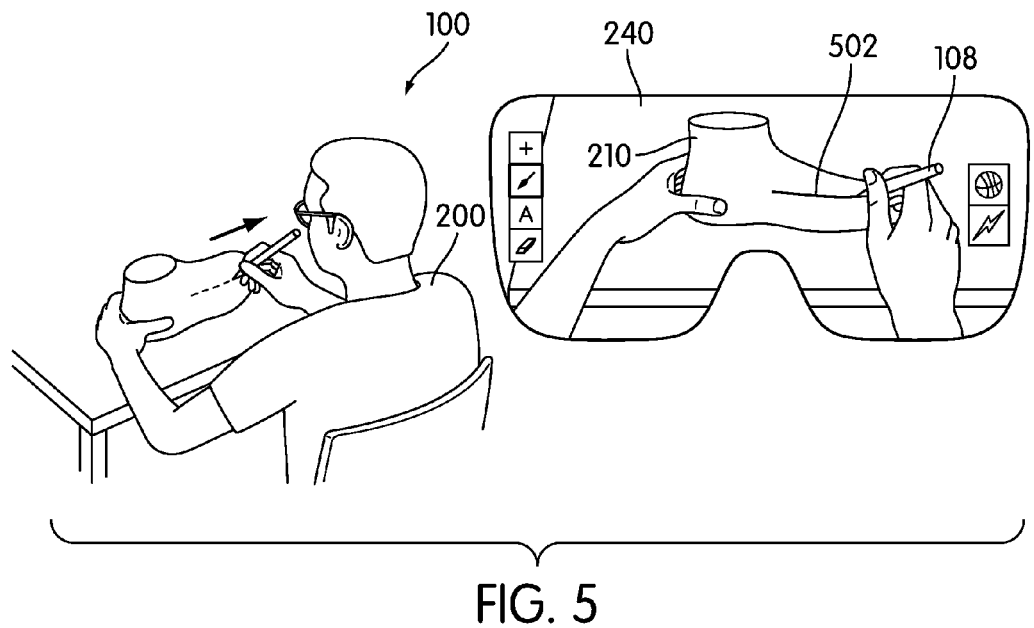
FIG. 5 is an isometric view of an embodiment of a design system used to apply a virtual line to a proxy.

Referring now to FIG. 5, with interacting device 108 functioning as a drawing tool, user 200 may begin to apply various virtual design elements to proxy 210. In this embodiment, user 200 may drag interacting device 108 against the surface of proxy 210 to create virtual line 502. In this case, imaging device 106 receives optical information that is transmitted to computing device 102. Using this optical information, computing device 102 tracks the position of interacting device 108 and is able to detect when interacting device 108 has made contact with the surface of proxy 210. Since interacting device 108 is currently functioning as a drawing tool, computing device 102 may generate virtual line 502 that is displayed on screen 240. In particular, virtual line 502 is displayed on a portion of screen 240 such that user 200 sees virtual line 502 as being disposed on top of proxy 210. In other words, system 100 combines virtual line 502 with proxy 210 to give the appearance that a line has been drawn directly onto proxy 210, from the perspective of user 200. Moreover, virtual line 502 is displayed substantially immediately after interacting device 108 has contacted proxy 210.

In some embodiments, virtual line 502 may be any type of line. In some cases, virtual line 502 may have a substantially straight, or linear, shape. In other cases, virtual line 502 could have a nonlinear shape. Furthermore, virtual line 502 may be a curved line that corresponds to the contours of the surface of proxy 210. This may enhance the perception that virtual line 502 is part of proxy 210, from the viewpoint of user 200.

In some embodiments, the properties of any lines created using system 100 could be varied. For example, in some cases, the thickness of a line could be varied using a virtual menu. In other cases, the style of line, including solid lines and dashed lines, could vary. Moreover, in some cases, the properties of a virtual line could be modified before applying a line to proxy or after the line has already been applied. It will be understood that any of the known features for modifying the properties of a line using graphic editing software could be used.

Figure 6:
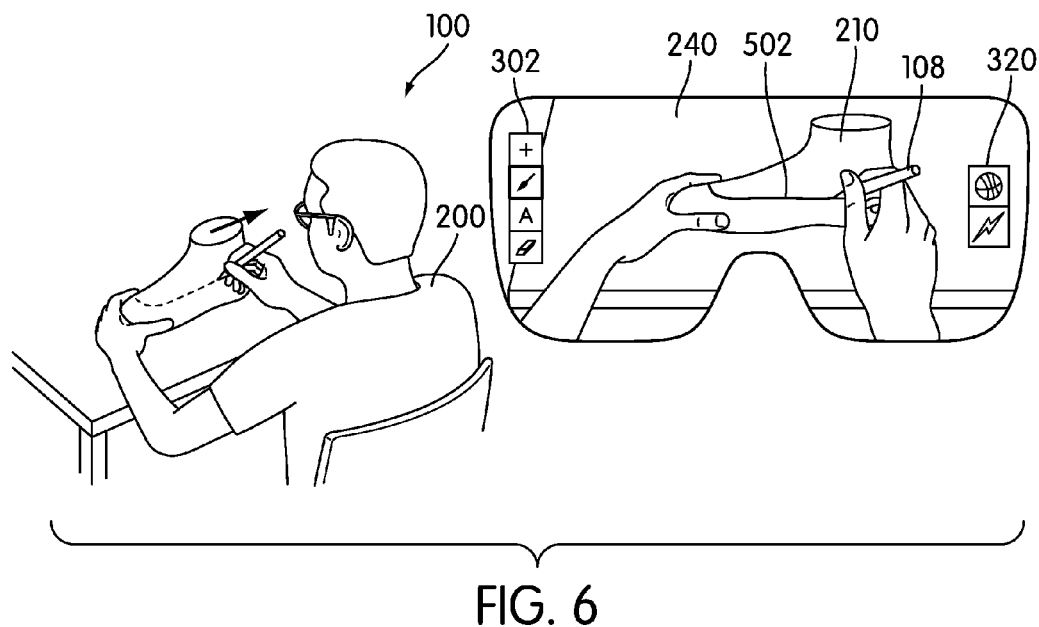
FIG. 6 is an isometric view of an embodiment of a design system used to apply a virtual line to a proxy.

Referring now to FIG. 6, user 200 may continue tracing a line over proxy 210 using interacting device 108. In this case, user 200 has rotated proxy 210 to continue drawing a single line from one side of proxy 210 to the other side. System 100 continues to track the position and orientation of proxy 210 and modifies the orientation of virtual line 502 accordingly to give the appearance of a line permanently drawn on the surface of proxy 210.

Figure 7:
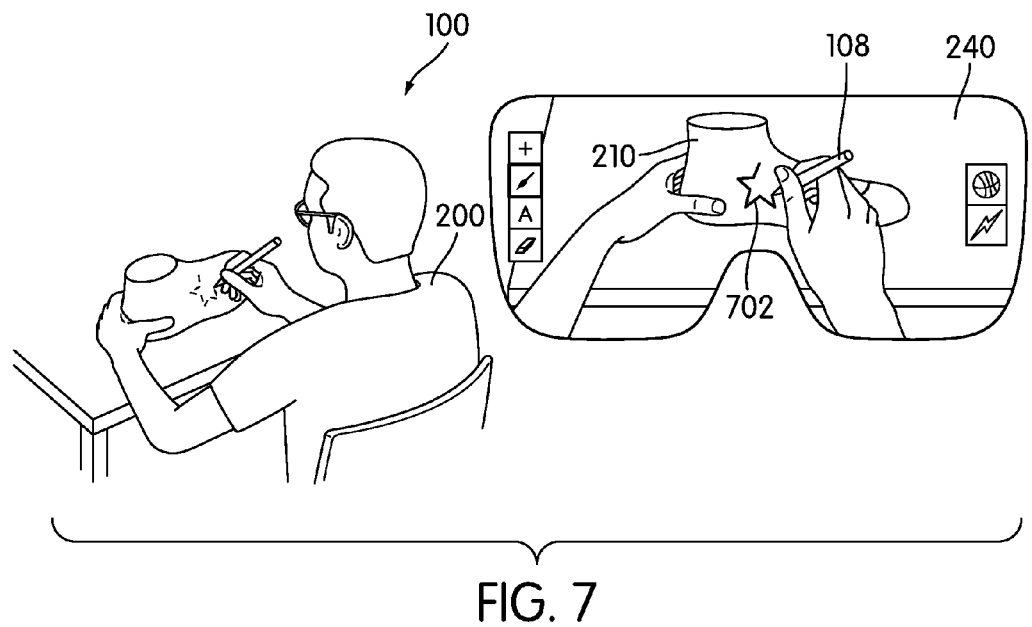
FIG. 7 is an isometric view of an embodiment of a design system used to apply a virtual shape to a proxy.

Referring now to FIG. 7, system 100 can be used to draw any kinds of shapes including, but not limited to: circles, ellipses, triangles, squares, rectangles, trapezoids, pentagons, hexagons, regular polygons, irregular polygons as well as any other kinds of shapes. In the current embodiment, user 200 may draw virtual star shape 702 onto the side of proxy 210 using interacting device 108.

System 100 can include provisions for applying different colors to a design for an article. In some embodiments, system 100 can be configured with one or more color palettes. A color palette may allow a user to select a color to be applied to any portion of a proxy. Various types of color palettes are known in the art and can include any type of color palette found in graphical editing software.

Figure 8:
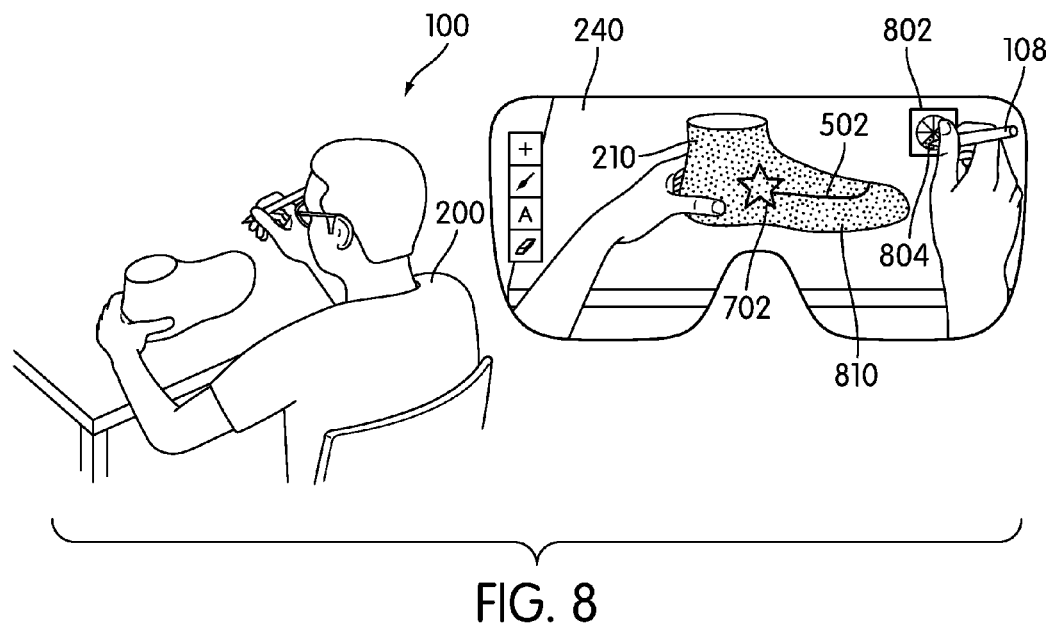
FIG. 8 is an isometric view of an embodiment of a design system used to modify the apparent color of a proxy.

Referring to FIG. 8, system 100 may include color palette 802. In some cases, color palette 802 may comprise a color-wheel type color palette. In other cases, color palette 802 may provide a plurality of boxes with different colors. User 200 may select a color from color palette 802 by pointing interacting device 108 at the desired color. In this embodiment, user 200 may select color 804 from color palette 802. This has the effect of changing the color of proxy 210 to color 804. In particular, system 100 may generate virtual coloring image 810 with color 804 that is applied over proxy 210. Virtual coloring image 810 has the approximate size, shape and orientation of proxy 210 so as to give the appearance that proxy 210 has been painted with color 804. Moreover, virtual line 502 and virtual star shape 702 are superimposed over virtual coloring image 810.

It will be understood that when user 200 rotates proxy 210 or when user 200 moves so as to change the perspective of proxy 210, system 100 continuously adjusts the orientation and position of virtual coloring image 810, virtual star shape 702 and virtual line 502 to give the appearance that these design elements have been permanently applied to the three dimensional proxy.

Figure 9:
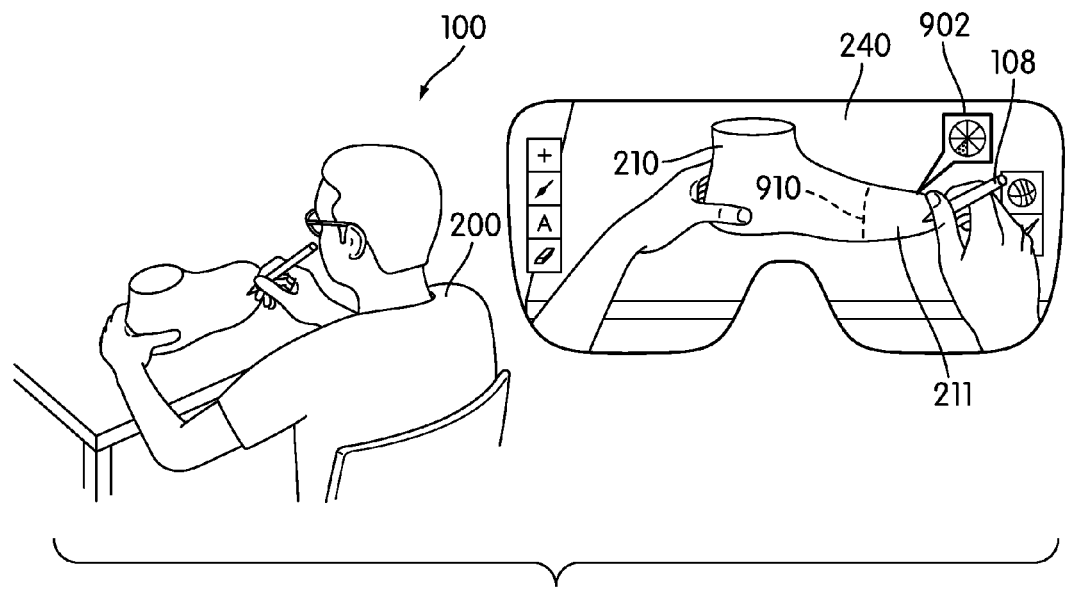
FIG. 9 is an isometric view of an embodiment of a design system used to modify the apparent color of a portion of a proxy.
Figure 10:
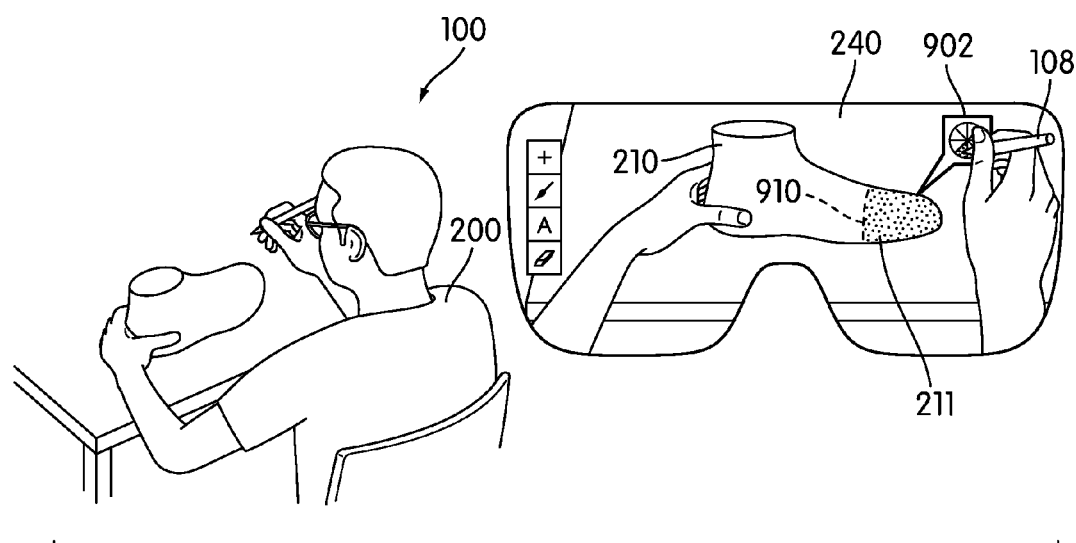
FIG. 10 is an isometric view of an embodiment of a design system used to modify the apparent color of a portion of a proxy.

Referring now to FIGS. 9 and 10, virtual colors for proxy 210 can also be configured on local portions of proxy 210. In the current embodiment, user 200 may select toe portion 211 of proxy 210 using interacting device 108. In some cases, to select toe portion 211, user 200 may set interacting device 108 to function as a selection tool. In other cases, user 200 may select a coloring tool from a virtual menu and then select the desired portion of proxy 210 for coloring.

In some cases, color palette 902 may appear as user 200 selects toe portion 211 using interactive device 108. In some cases, toe portion 211 may be highlighted using virtual boundary 910. At this point, as seen in FIG. 10, user 200 may select a color for toe portion 211 using color palette 902. This color may then be applied throughout toe portion 211.

Although the current embodiment shows a user modifying the color of toe portion 211, in other cases, a user could modify any other portion of proxy 210. Other portions that could be colored include, but are not limited to: a midfoot portion, a heel portion, a lower portion, an upper portion, a medial portion, a lateral portion as well as any other portion of proxy 210. In embodiments where proxy 210 comprises a sole portion and an upper portion, a user could separately modify the color of the sole portion and/or the upper portion. In addition, in embodiments where a proxy includes a lacing portion that includes laces or markings indicating the location of laces, a user could modify the color of the lacing portion.

Figure 11:
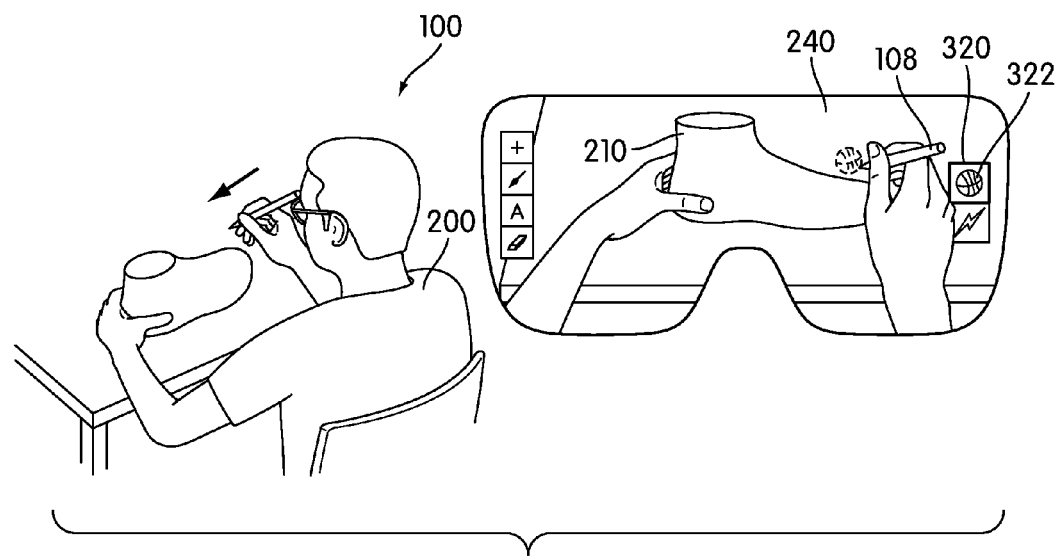
FIG. 11 is an isometric view of an embodiment of a design system used to apply a virtual graphic to a proxy.
Figure 12:
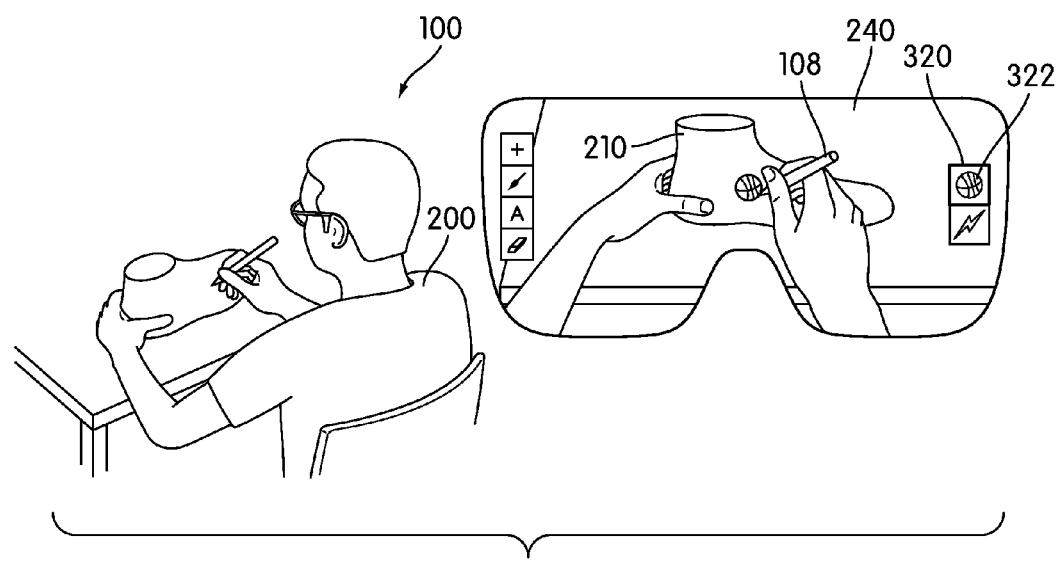
FIG. 12 is an isometric view of an embodiment of a design system used to apply a virtual graphic to a proxy.

Referring now to FIGS. 11 and 12, user 200 may apply one or more virtual graphics to proxy 210. In this case, user 200 may select first graphic 322 from graphics menu 320 using interacting device 108. User 200 may then place first graphic 322 on the surface of proxy 210 by contacting proxy 210 with interacting device 108. At this point, system 100 may automatically adjust the appearance of first graphic 322 so first graphic 322 appears to be physically located on proxy 210. Moreover, as proxy 210 is moved and rotated, system 100 may adjust the orientation and position of first graphic 322 accordingly. Although the current embodiment illustrates a single graphic being applied to proxy 210, in other embodiments two or more graphics could be applied to proxy 210.

Generally, virtual graphics applied to a proxy could be predesigned graphics or custom designed graphics. For example, in some cases, a user could create a custom designed graphic using system 100 and store the graphic in graphics menu 320. This allows a user to retrieve the graphic at any time for application to a proxy. In other embodiments, system 100 could provide a set of predesigned graphics.

Figure 13:
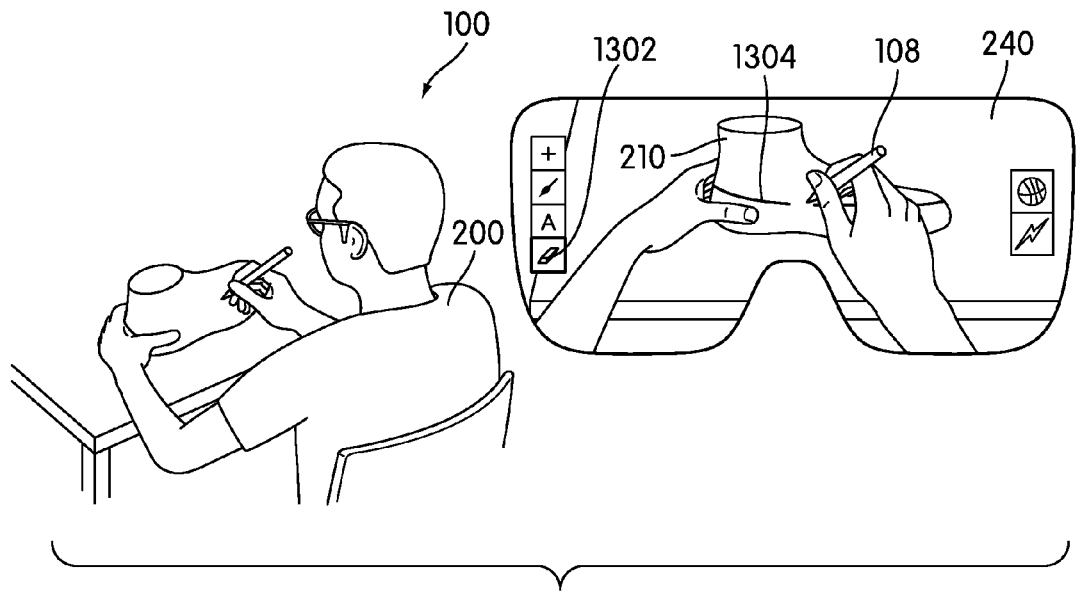
FIG. 13 is an isometric view of an embodiment of a design system used to erase a portion of a virtual stripe.

Referring to FIG. 13, user 200 may delete portions of a virtual object using eraser tool 1302. In this case, user 200 may erase portions of virtual line 1304 by touching interacting device 108 to the portion of proxy 210 associated with virtual line 1304. This has the effect of deleting a portion of virtual line 1304.

In some embodiments, system 100 could provide a user with one or more pre-existing designs or template designs. Template designs may include any design for a proxy that has been created prior to the current design session. In some cases, template designs could be provided by a proprietor. In other cases, template designs could be created by a user during a previous design session.

Figure 14:
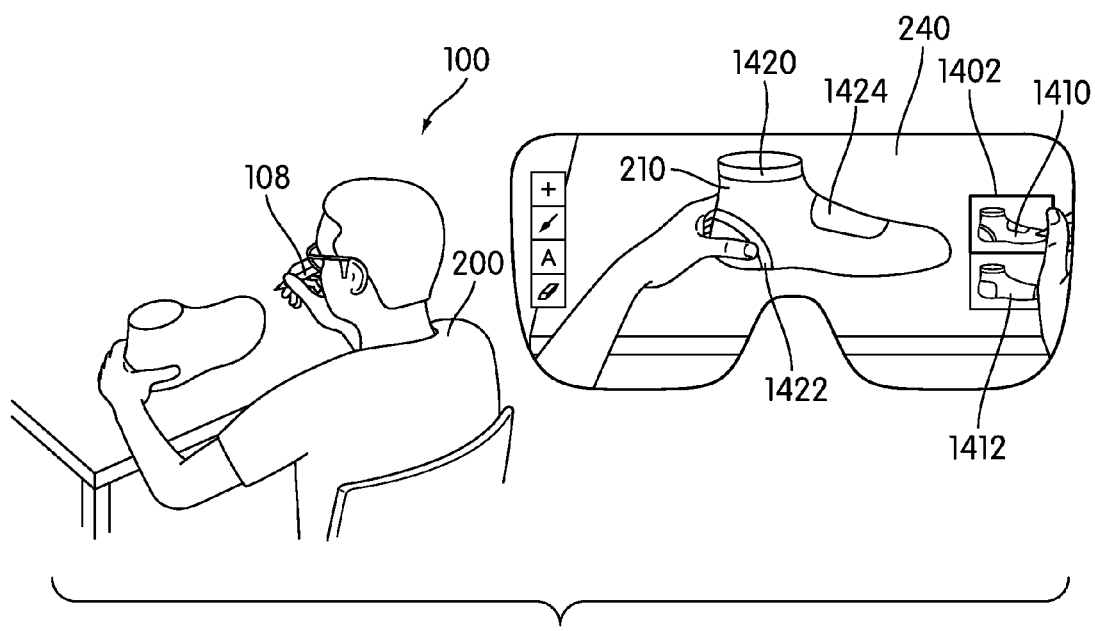
FIG. 14 is an isometric view of an embodiment of a design system used to modify a design template for an article.
Figure 15:
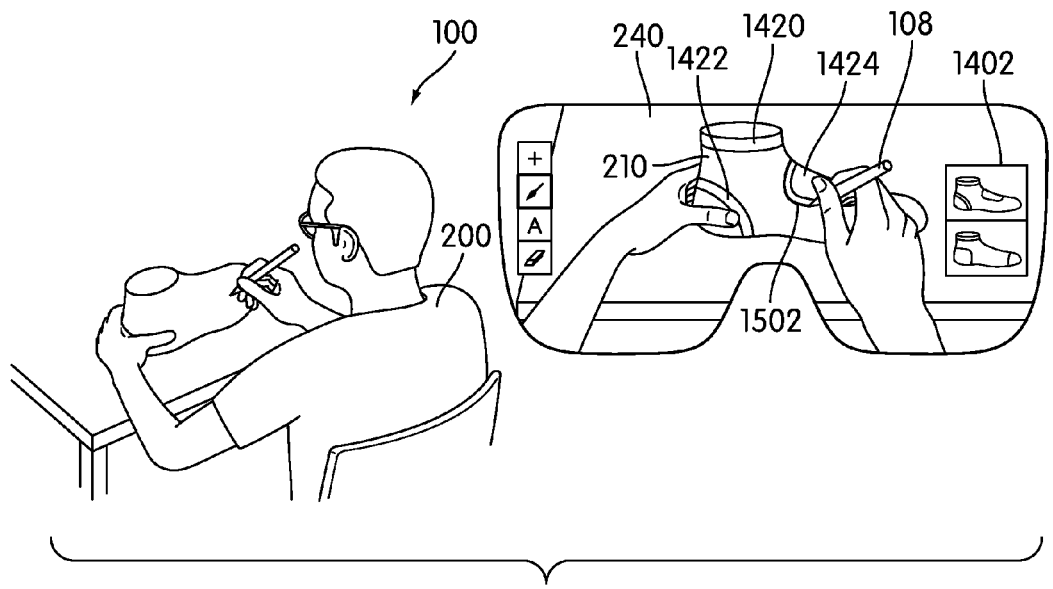
FIG. 15 is an isometric view of an embodiment of a design system used to modify a design template for an article.
Figure 16:
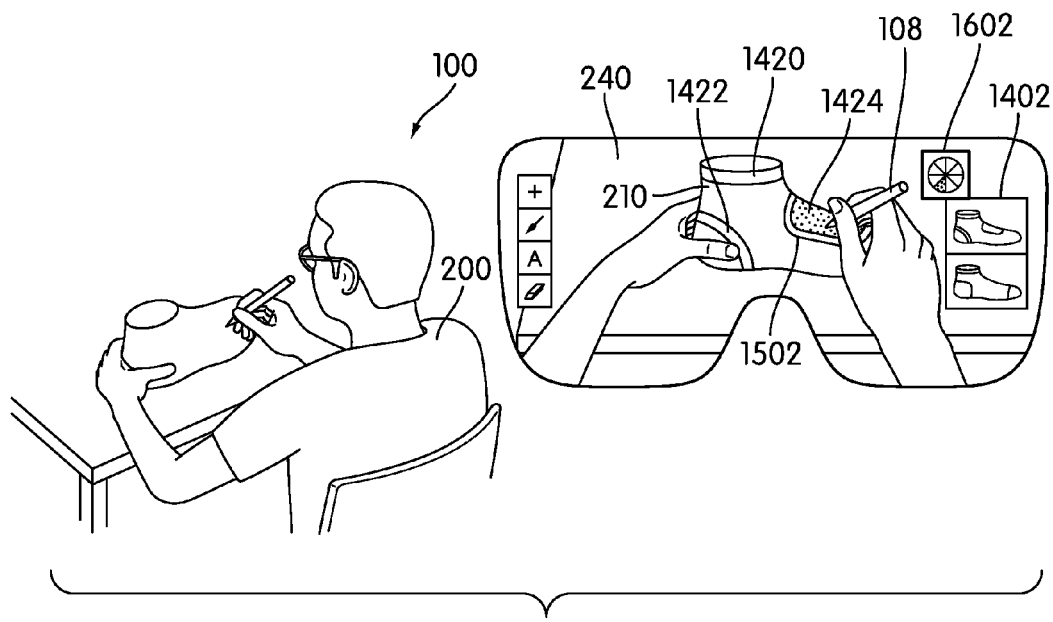
FIG. 16 is an isometric view of an embodiment of a design system used to modify a design template for an article.

FIGS. 14 through 16 illustrate the use of an embodiment of system 100 for working with template designs. Referring to FIG. 14, user 200 may select a template design from template menu 1402. In this case, template menu 1402 includes first template design 1410 and second template design 1412. User 200 has selected first template design 1410 using interacting device 108. With first template design 1410 selected, a set of virtual design elements are automatically generated and displayed over proxy 210. For example, in the current embodiment, first template design 1410 includes virtual upper trim 1420, virtual stripe 1422 and virtual upper panel 1424. This arrangement allows a user to modify an existing design, rather than having to create a design for an article from scratch.

Upon selecting a template design for proxy 210, user 200 may modify the design using any of the graphics tools discussed previously or any other known graphics tools. For example, referring to FIG. 15, user 200 may add virtual border 1502 around virtual upper panel 1424 using a drawing tool. In addition, as seen in FIG. 16, a user may modify the color of virtual upper panel 1424 using color palette 1602.

Using this arrangement, a user may make modifications to existing designs to produce articles with new and unique design characteristics. A designer could use this feature when designing a successor to a current model of footwear. For example, some articles may be redesigned on an approximately annual basis. The configuration discussed here would allow a designer to select a template design corresponding to the most recent model of footwear from the previous year and start redesigning the footwear immediately, rather than having to start with a blank design.

System 100 may include provisions for applying virtual designs to various types of proxies. In some cases, system 100 could be configured for use with fully formed articles, rather than models of the articles. For example, in situations where system 100 is used for designing an article of footwear, the proxy could be a specific type of shoe rather than a footwear last.

Figure 17:
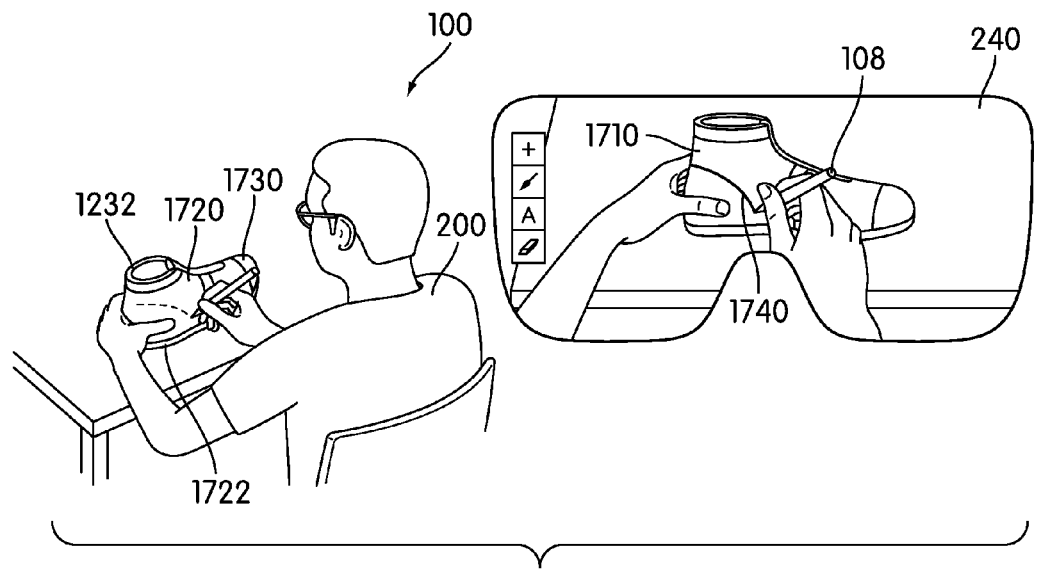
FIG. 17 is an isometric view of an embodiment of a design system used to apply virtual objects to an article of footwear that is used as a proxy.

FIG. 17 illustrates an embodiment of system 100 that uses an article of footwear for proxy 1710 rather than a footwear last. Referring to FIG. 17, proxy 1710 comprises upper 1720 and sole structure 1722. In addition, upper 1720 includes first design element 1730 and second design element 1732. These design elements are physical design elements that are part of proxy 1710. In some cases, using an article of footwear for proxy 1710 may help a user to visualize the final manufactured product.

In this embodiment, user 200 may apply virtual line 1740 to proxy 1710 using interactive device 108. As user 200 drags interacting device 108 across the surface of proxy 1710, virtual line 1740 is displayed on screen 240 over proxy 1710. This gives the appearance of a line that has been created on proxy 1710. With this arrangement, a user can modify the design of an existing article of footwear by applying virtual objects or virtual images to the article of footwear using system 100.

For purposes of clarity, the current embodiments illustrate designing an article with various lines, colors, graphics as well as other kinds of indicia. However, it should be understood that in other embodiments, additional sorts of components for an article could be designed using an augmented reality design system. In some cases, design lines produced using an augmented reality design system could represent functional features of an article.

In some embodiments, a design system could be used for designing various physical and/or functional components including, but not limited to: straps, heel counters, toe caps, outsoles, midsoles, laces, as well as other functional components for an article. For example, in one embodiment, a user could design an outsole for a sole by drawing a traction pattern on the bottom surface of a proxy. In another example, a user could draw a strap onto a portion of a proxy. As another example, a user could draw one or more inserts that may be utilized with one or more portions of an article. Examples of straps and inserts that could be designed using an augmented reality design system can be found in Gerber, U.S. Patent Application Publication Number 2010/0180469, directed to an Article of Footwear with a Customizable Upper; the entirety of which is hereby incorporated by reference.

In some embodiments, design lines indicating outsole patterns, straps, heel counters as well as any other functional components may be used by a proprietor to design a finished article. In some cases, a system can include provisions for distinguishing between functional design lines (for example, lines indicating a heel counter) and decorative design lines (for example, lines indicating one or more stripes). In some cases, design lines intended to be associated with functional components could be stored with additional information so that a proprietor can easily distinguish between different types of design lines. In other cases, however, each design line may be stored in a substantially similar manner and a proprietor may rely on context or other cues to distinguish functional design lines from design lines used for decoration.

Figure 18:
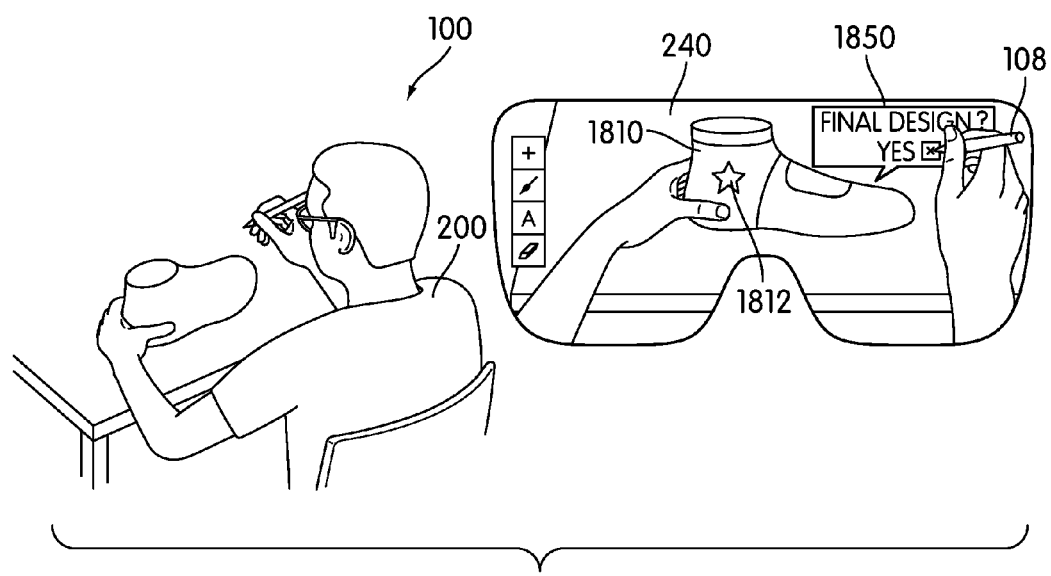
FIG. 18 is an isometric view of an embodiment of a step of finalizing a design for an article.

Referring now to FIG. 18, in some cases, system 100 may prompt a user when a design session has concluded. For example, in the current embodiment, user 200 has finished creating a design for an article using proxy 1810. In particular, user 200 has applied virtual design elements 1812 to proxy 1810 using system 100. At this point, system 100 may prompt user 200 to determine if the design should be finalized. In some cases, dialogue box 1850 may be displayed for user 200. In this case, user 200 indicates that the he is done designing an article using interacting device 108.

Figure 19:
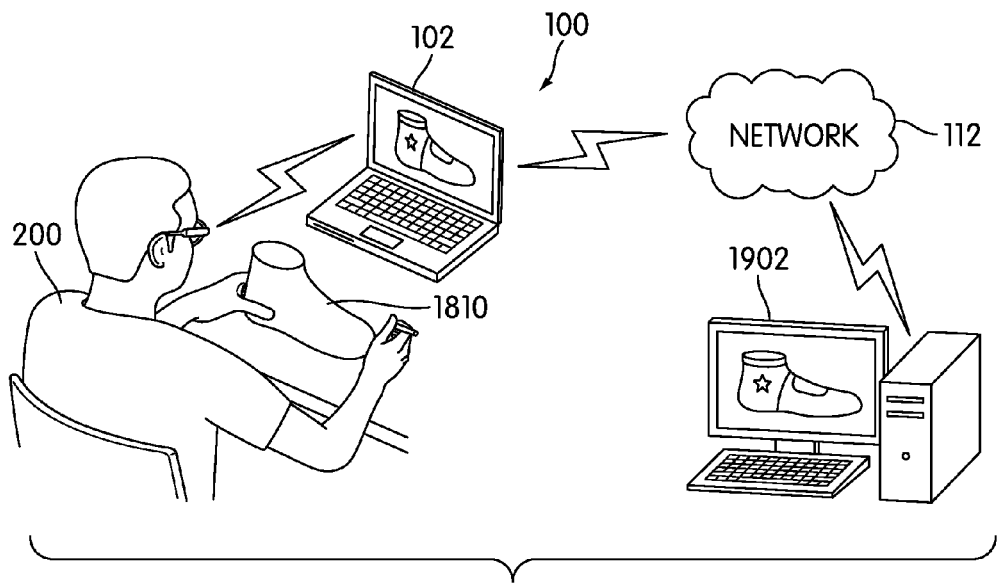
FIG. 19 is a schematic view of an embodiment of a finalized design being submitted to a proprietor.

The finalized design may be submitted to a proprietor for purposes of manufacturing a finalized article of footwear. As seen in FIG. 19, in some cases, the finalized design may be transmitted to computing device 1902 of a proprietor through network 112. At this point, the proprietor may manufacture an article of footwear using the finalized design.

Figure 20:
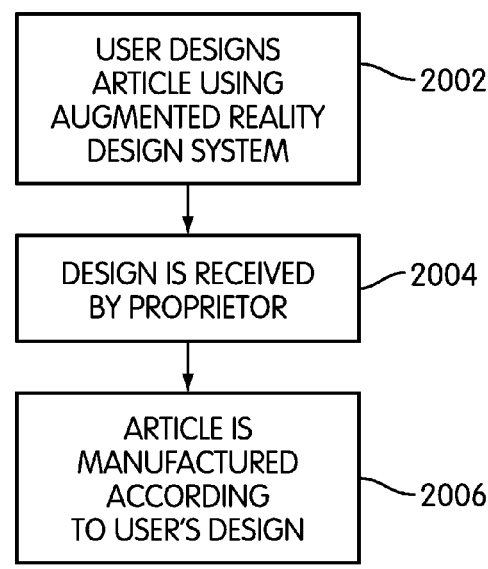
FIG. 20 is an embodiment of a process for designing and manufacturing an article of footwear.

FIG. 20 illustrates an embodiment of a process of creating an article that has been designed using system 100. In this embodiment, some of the following steps may be performed by any proprietor configured to manufacture and/or sell articles. Also, some of the steps may be performed by a customer or any other user of system 100. In addition, it will be understood that in other embodiments one or more of the following steps may be optional.

During step 2002, a user may design an article using augmented reality design system 100. Methods and tools for designing an article in this manner have been discussed in detail above. Next, during step 2004, the design may be received by a proprietor. The proprietor can include any of the various operations on the manufacturing side, including the operations responsible for parts, labor, and/or retail of the article of footwear, as well as other manufacturing side operations. Next, during step 2006, an article may be manufactured according the design submitted by the user. This step can be accomplished using any known manufacturing technology. Examples of one type of manufacturing technology that could be used is disclosed in U.S. Ser. No. 11/612,320, filed on Dec. 18, 2006, the entirety of which is hereby incorporated by reference.

As previously discussed, an augmented reality design system can be used for designing any kind of article. In some embodiments, an augmented reality design system can include provisions for designing articles of clothing. In an exemplary embodiment, an augmented reality design system can include provisions for designing shirts and pants.

Figure 21:
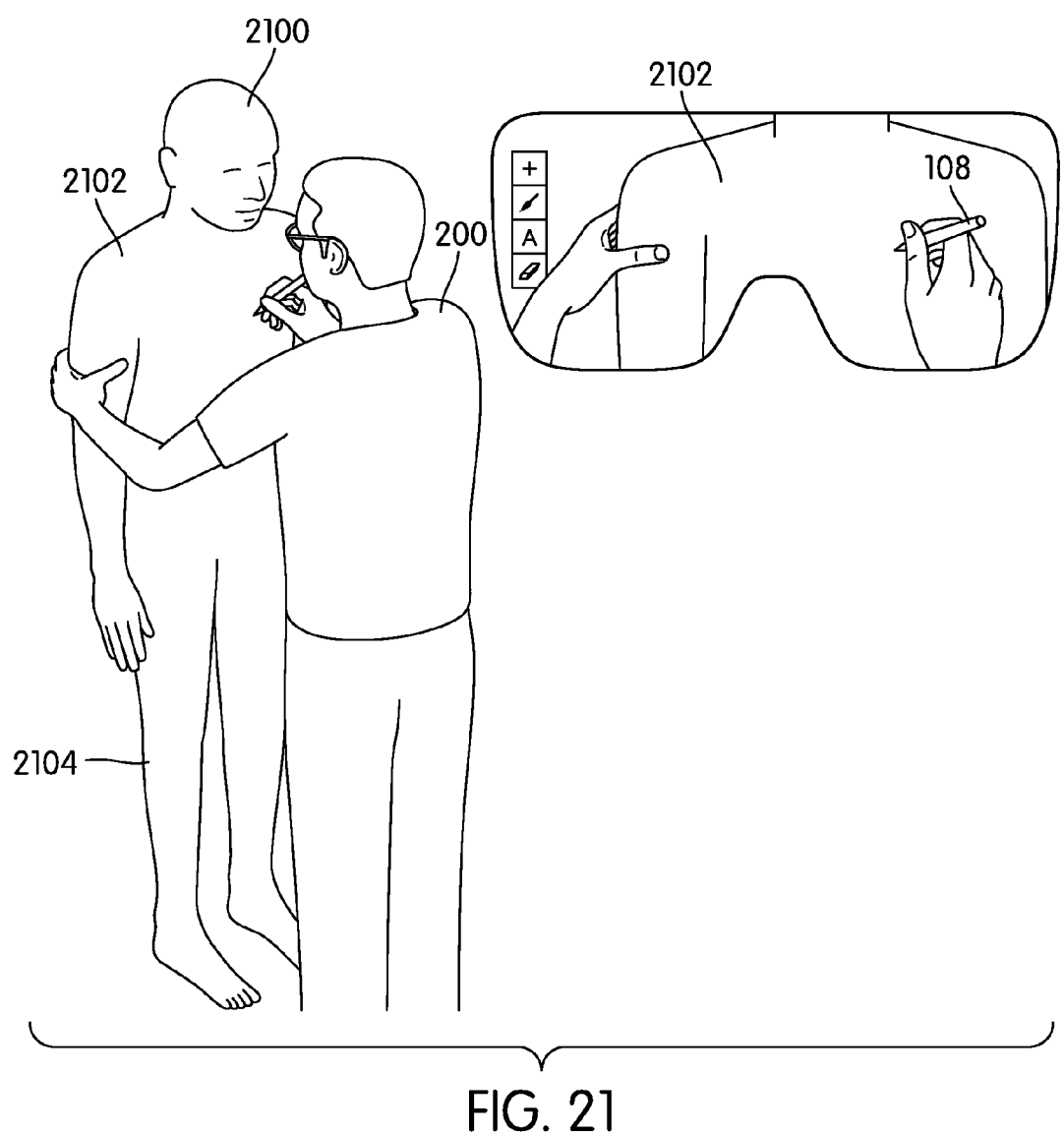
FIG. 21 is an isometric view of an embodiment of a design system used to design articles of clothing.
Figure 22:
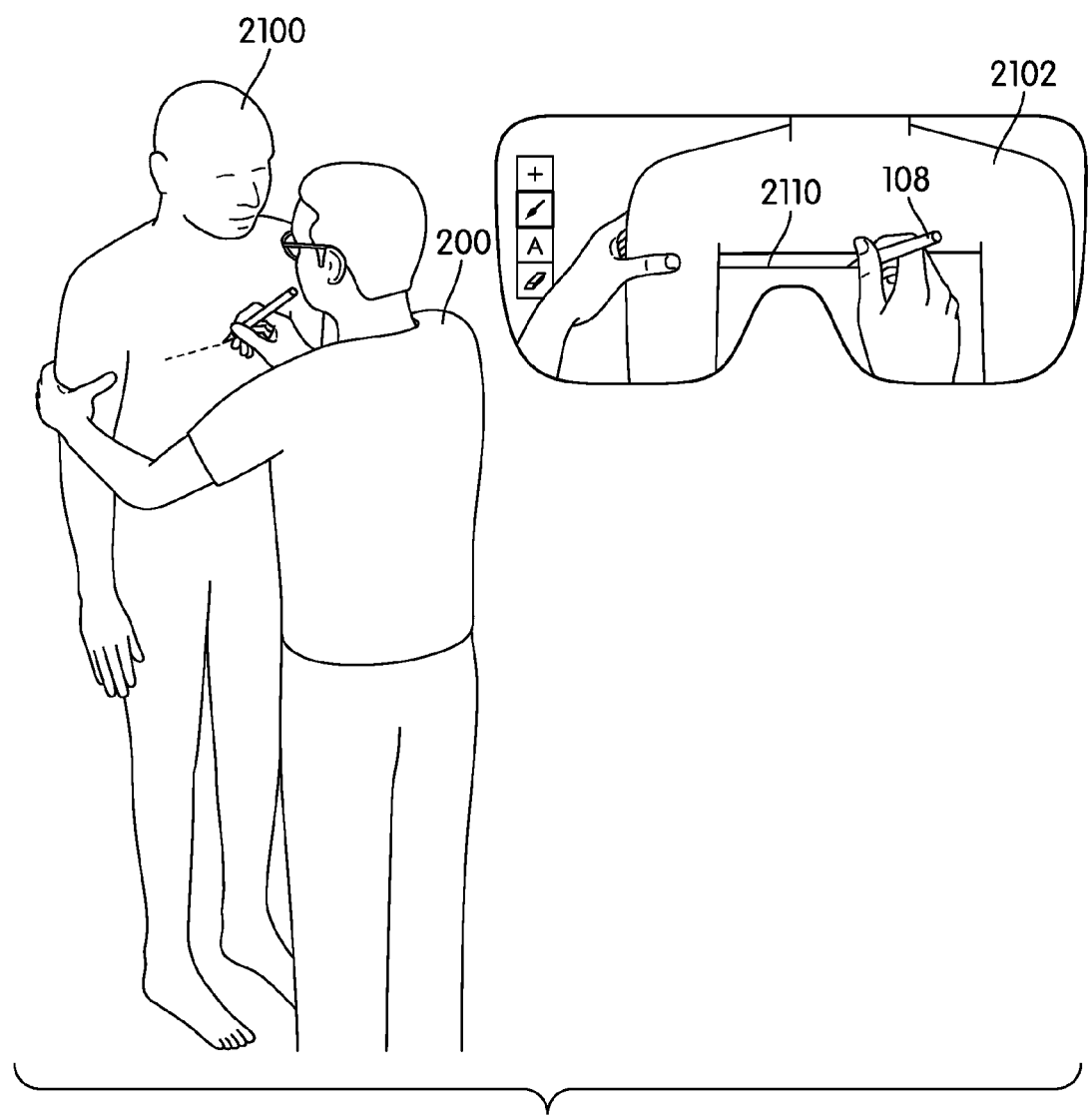
FIG. 22 is an isometric view of an embodiment of a design system used to design articles of clothing.
Figure 23:
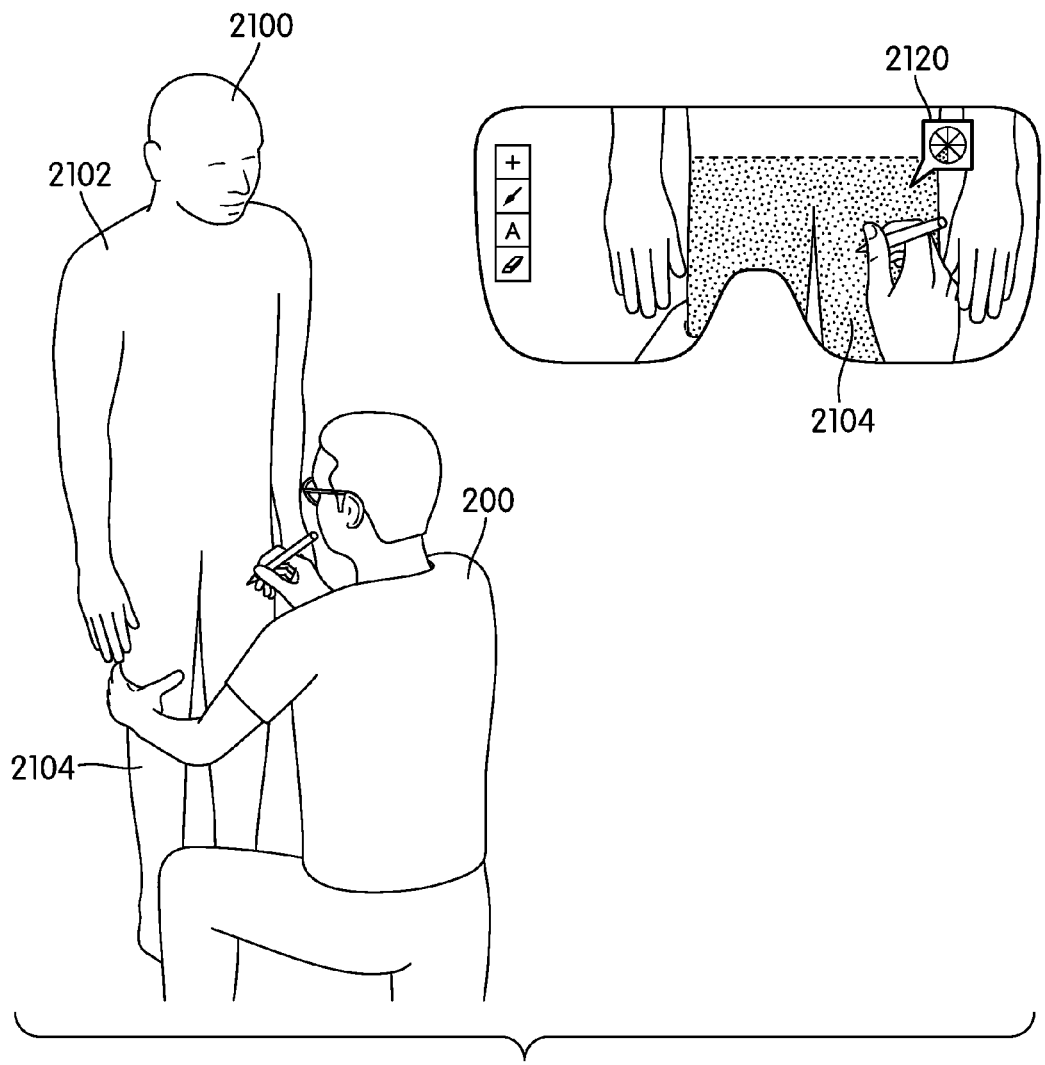
FIG. 23 is an isometric view of an embodiment of a design system used to design articles of clothing.

FIGS. 21 through 23 illustrate an embodiment of augmented reality design system 100 that is configured for designing various articles of clothing. In this case, system 100 may be used with proxy 2100. Proxy 2100 may have the general form of a full length mannequin. In particular, proxy 2100 includes upper portion 2102 that may be used to design various articles that are worn on the torso and arms including t-shirts, long sleeve shirts, button-up shirts, sweaters, vests, jackets as well as any other kinds of articles. Proxy 2100 may also include lower portion 2104 that may be used to design various articles that are worn on the legs including pants, jeans, khakis, shorts, skirts, swimsuits as well as any other kinds of articles. Moreover it will be understood that proxy 2100 can be used for designing articles that extend over both upper portion 2102 and lower portion 2104, including, but not limited to: dresses, suits, swimsuits, uniforms of various kinds as well as any other kinds of articles.

Generally, the various graphic tools for creating designs for articles of footwear that have been discussed in the previous embodiments can also be applied to creating designs for any other articles including shirts and/or pants. Referring to FIG. 22, user 200 may create a design for a shirt by applying virtual images to upper portion 2102. In this case, user 200 may create virtual stripes 2110 using interacting device 108. In addition, as seen in FIG. 23, user 200 may create a design for a pair of pants by modifying the color of lower portion 2104 of proxy 2100 using color palette 2120.

The current embodiments are not intended to be limiting and in other embodiments, system 100 could be used with any other types of proxies for purposes of designing various different types of articles. As another example, system 100 can be used with a proxy shaped like a head for the purposes of designing hats. In still another example, system 100 can be used with a proxy having a hand-like shape for purposes of designing gloves. Moreover, the system is not necessarily restricted to use in designing articles that may be worn, as previously discussed. In another embodiment, system 100 could be used with a proxy having a bag-like shape for purposes of designing various kinds of bags including, but not limited to: purses, backpacks, luggage as well as other kinds of bags.

In the current embodiment, proxy 2100 may be blank without any markings. However, in other embodiments, to facilitate designing an article, proxy 2100 could include various types of markings that indicate the approximate locations of various features for an article of clothing. For example, in one embodiment, proxy 2100 could include marking indicating the boundaries of a short sleeve shirt that may be associated with proxy 2100. In another embodiment, proxy 2100 could include markings indicating the boundaries of a pair of pants that may be associated with proxy 2100. In some cases, providing additional markings may allow a user to adapt the design to various different features of the article of clothing. Furthermore, it will be understood that in some cases these markings could be physically provided on proxy 2100 and in other cases such markings could be applied virtually using system 100.

In addition, in some cases, a user could place an article of clothing directly onto proxy 2100. For example, to design a shirt, a user could place a shirt onto upper portion 2102 of proxy 2100. Then, using system 100, the user could apply various virtual design elements to the shirt. Similarly, a user could place a pair of pants onto lower portion 2104 of proxy 2100 and apply various virtual design elements to the pants.

An augmented reality design system can include provisions for applying virtual images to a proxy without the use of a display device. In some cases, a virtual image may be superimposed directly onto a proxy. In an exemplary embodiment, a virtual image may be projected directly onto a proxy for purposes of designing an article in real time.

Figure 24:
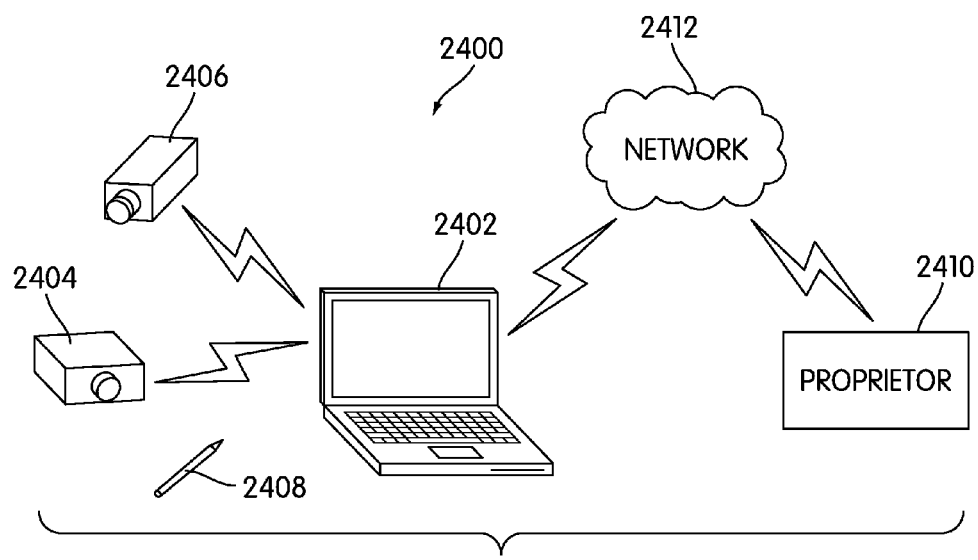
FIG. 24 is a schematic view of another embodiment of a design system.

FIG. 24 illustrates another embodiment of augmented reality design system 2400, also referred to hereafter as system 2400. System 2400 may include substantially similar systems and components to system 100 discussed above. For example, system 2400 may include computing device 2402. Computing device 2402 may be any type of computer, including either a desktop or a laptop computer. In other embodiments, computing device 2402 may be any type of device that includes a display, a processor, and the ability to transmit and receive data from one or more external sources. Examples of such devices include, but are not limited to: PDA's, cell phones, as well as other types of devices.

System 2400 can include provisions for superimposing virtual images or virtual objects directly onto a proxy of some kind. In some embodiments, system 2400 can include projecting device 2404. Projecting device 2404 may be any type of projector that is known in the art. Examples of projecting devices that may be used in augmented reality systems are known in the art. In an exemplary embodiment, projecting device 2404 may be a digital projector.

System 2400 can include provisions for capturing visual information. In some embodiments, system 2400 can include imaging device 2406. Imagine device 2406 can be any device capable of sensing optical information. In some cases, imaging device 2406 can be a camera. In some cases, imaging device 2406 may be a video camera of some kind. Examples of different types of video cameras that could be used include charge coupled device (CCD) cameras, complementary metal-oxide-semiconductor (CMOS) cameras, other types of active pixel sensor cameras as well as any other type of video cameras.

Generally, imaging device 2406 can be disposed in any location with respect to various components of system 2400. In some cases, imaging device 2406 can be stationary. In other cases, imaging device 2406 can be mounted to another component of system 2400. In an exemplary embodiment, imaging device 2406 may mounted to a user in some way. For example, in one embodiment, imaging device 2406 may be mounted to a headset of some kind worn by the user. In other cases, however, imaging device 2406 may be disposed in a stationary location with respect to a user and/or a proxy.

System 2400 can include provisions for interacting with an augmented reality environment. In some cases, system 2400 can include interacting device 2408. Interacting device 2408 may take any form. In some cases, interacting device 2408 could comprise a stylus. For example, interacting device 2408 could comprise a stylus similar to the kind used with personal digital assistants (PDAs), in which the stylus is a substantially monolithic component that is used for applying pressure to a display. In the current embodiment, interacting device 2408 is a substantially monolithic component with the approximate shape of a pen. In other cases, however, interacting device 2408 could have any other shape, size and composition.

In some embodiments, one or more components of system 2400 may communicate with computing device 2402. In some cases, imaging device 2406 may communicate with computing device 2402. Additionally, in some cases, projecting device 2404 may communicate with computing device 2402. Imaging device 2406 and projecting device 2404 could communicate with computing device 2402 using any type of wireless and/or wired connections. In some cases, imaging device 2406 and projecting device 2404 can communicate with computing device 2402 using a network of some kind. Examples of such networks include, but are not limited to: personal area networks, local area networks, wide area networks, client-server networks, peer-to-peer networks, as well as other types of networks. In some cases, a wireless local or personal area network using the Bluetooth® protocol is used to facilitate communication between computing device 2402 and imaging device 2406 and/or projecting device 2404. With this arrangement, images gathered from imaging device 2406 can be received by computing device 2402 and combined with virtual information. The combined information can then be transmitted back to projecting device 2404 to be projected onto a proxy. In particular, this allows system 2400 to augment the appearance of a proxy with one or more virtual objects or images.

Although the current embodiment uses a single imaging device, other embodiments could include two or more imaging devices. Moreover, it will be understood that in other embodiments any other kinds of sensors could be used with system 2400. An example of a system using additional kinds of sensors is discussed in detail below.

For purposes of clarity, system 2400 is shown with a single projecting device in the current embodiment. By rotating a proxy, a single projecting device may be used to generate virtual images onto various different sides of the proxy so as to give the appearance of the virtual images being part of the proxy. However, in some cases where a user may walk around a stationary proxy to view different sides, it may be necessary to use more than one projecting device to simultaneously apply virtual images to multiple sides of the proxy. Therefore, in other embodiments, system 2400 could include two or more projecting devices.

Although computing device 2402 is shown as a stand-alone computer in the current embodiment, in other embodiments, computing device 2402 could be integrated with other components of system 2400. For example, in another embodiment, computing device 2402 could be integrated with projecting device 2404. In particular, projecting device 2404 could include provisions for processing optical information received by imaging device 2406 as well as for generating virtual images to be projected directly onto a proxy. In still other embodiments, computing device 2402 could be integrated with any other components of system 2400. In another example, computing device 2402 could be a portable device that may be worn or carried by a user to enhance the portability of system 2400. Furthermore, in some embodiments, computing device 2402 may not be located near various components of system 2400. For example, in another embodiment, imaging device 2406 and projecting device 2404 may communicate remotely with computing device 2402 using a network as discussed above.

System 2400 can include provisions for communicating with proprietor 2410. In some cases, computing device 2402 and proprietor 2410 can communicate using network 2412. Generally, network 2412 can be any type of network including any of the networks discussed above.

Figure 25:
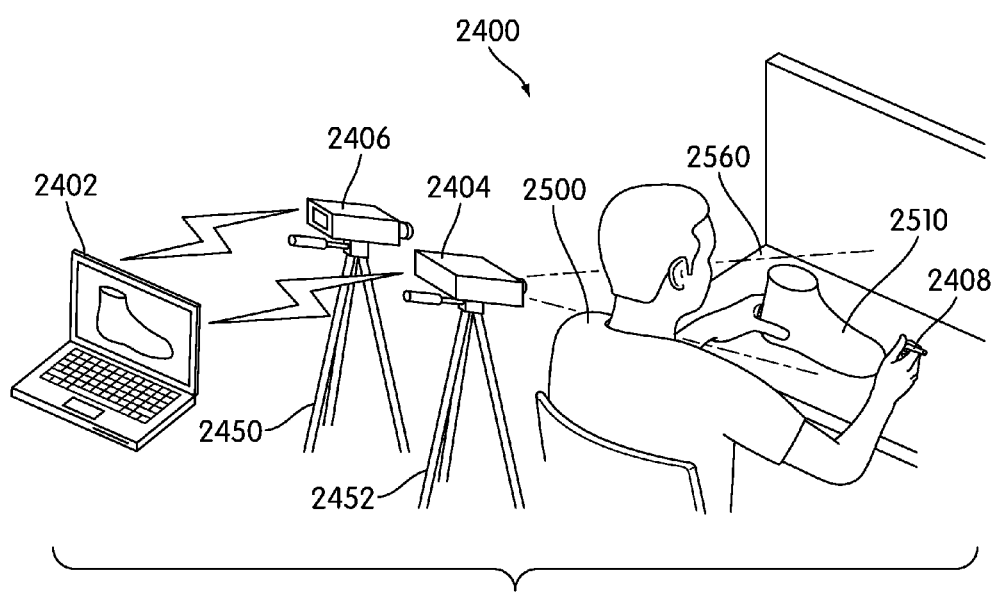
FIG. 25 is a schematic view of an embodiment of a design system used to design an article.

FIGS. 25 through 29 are intended to illustrate the operation of an embodiment of system 2400. Referring to FIG. 25, system 2400 may be used with proxy 2510 for purposes of designing an article. In this case, proxy 2510 has a footwear last-like geometry and may be used for designing articles of footwear. In other embodiments, however, system 2400 could be used with any other type of proxy for purposes of designing any kind of articles. Examples of other articles that could be designed using system 2400 include any of the articles discussed previously as well as any other kinds of articles.

In the current embodiment, proxy 2510 is disposed on workbench 2560. In other cases, however, proxy 2510 could be disposed on a stand of some kind. In addition, imaging device 2406 and projecting device 2404 are mounted to first tripod 2450 and second tripod 2452, respectively. In other cases, however, imaging device 2406 and/or projecting device 2404 could be set up in any other manner.

Figure 26:
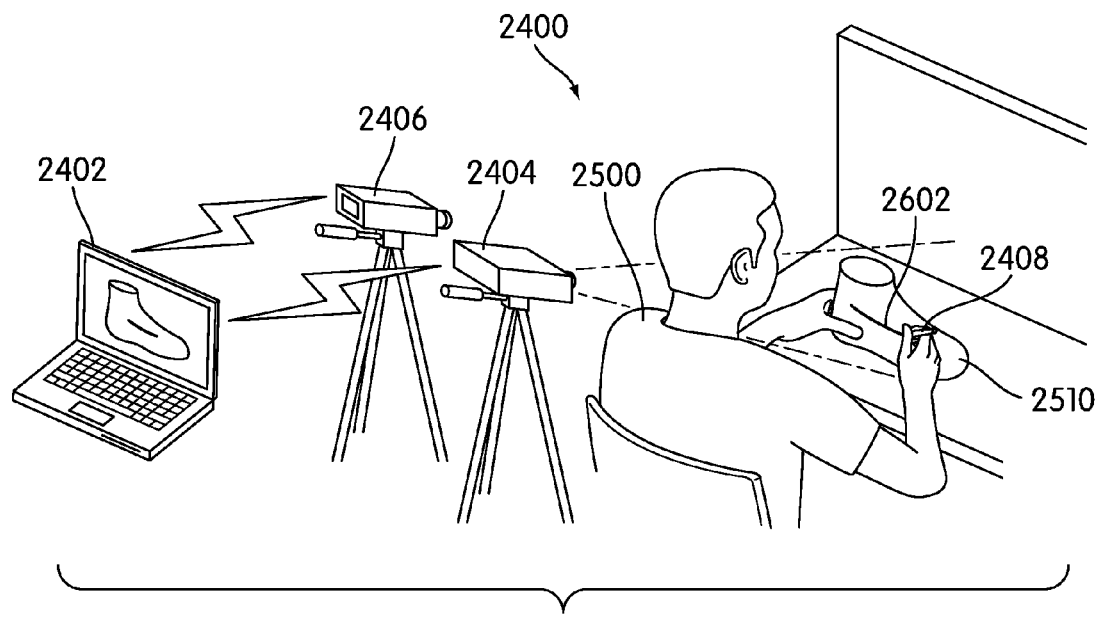
FIG. 26 is a schematic view of an embodiment of a design system used to design an article.

Referring to FIG. 25, projecting device 2404 may be configured to project images onto proxy 2510. At this point, since no virtual image has been created by user 2500, projecting device 2404 may not project any images onto proxy 2510. However, as user 2500 contacts proxy 2510 with interacting device 2408, system 2400 may be configured to generate virtual line 2602, as seen in FIG. 26. In particular, as imaging device 2406 may be used to track the locations of proxy 2510 as well as interacting device 2408. As interacting device 2408 contacts proxy 2510, system 2400 automatically generates a mark at the contact point. This mark is projected by projecting device 2404 directly onto proxy 2510. As user 2500 drags interacting device 2408 across a portion of proxy 2510, a line is generated substantially immediately and projected onto proxy 2510 using projecting device 2404. With this arrangement, user 2500 sees proxy 2510 as having a modified appearance though no actual line has been physically drawn on proxy 2510. In other words, virtual line 2602 is projected onto proxy 2510 so as to appear to be a part of proxy 2510.

Figure 27:
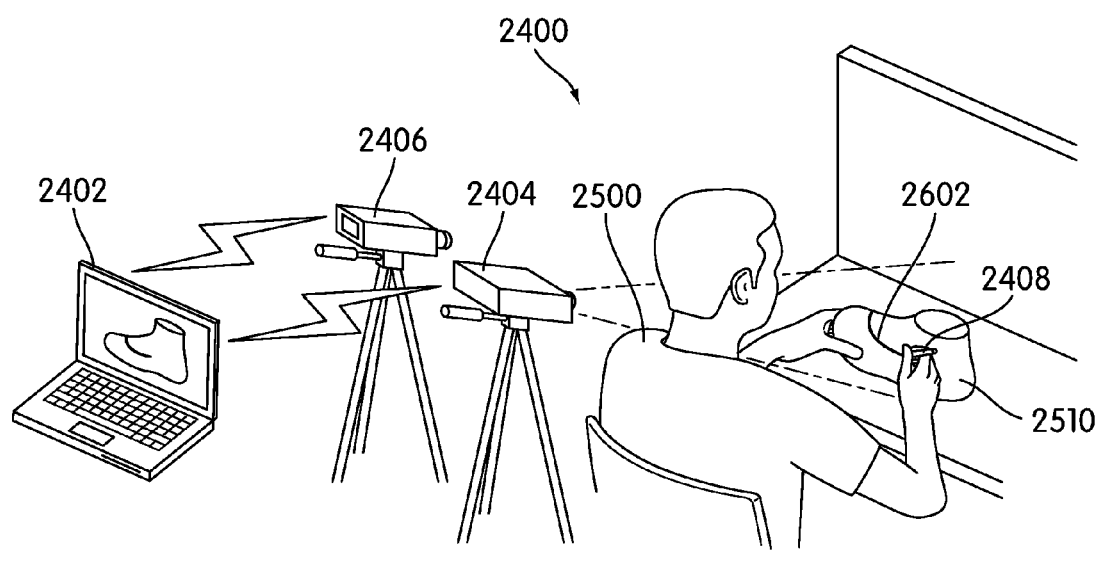
FIG. 27 is a schematic view of an embodiment of a design system used to design an article.

Referring now to FIG. 27, user 2500 may rotate proxy 2510 to continue drawing virtual line 2602. As proxy 2510 is rotated, system 2400 modifies the orientation of virtual line 2602 accordingly so that virtual line 2602 continues to appear as a line that is permanently drawn onto proxy 2510. This reorientation of virtual line 2602 may be accomplished by tracking the position and orientation of proxy 2510 and recalculating a new version of virtual line 2602 to accommodate changes in the position and orientation of proxy 2510.

System 2400 can include provisions for allowing a user to interact with one or more design tool menus. In some cases, system 2400 can include menus that are visible to a user. In an exemplary embodiment, system 2400 can project one or more menus onto a surface using projecting device 2404.

Figure 28:
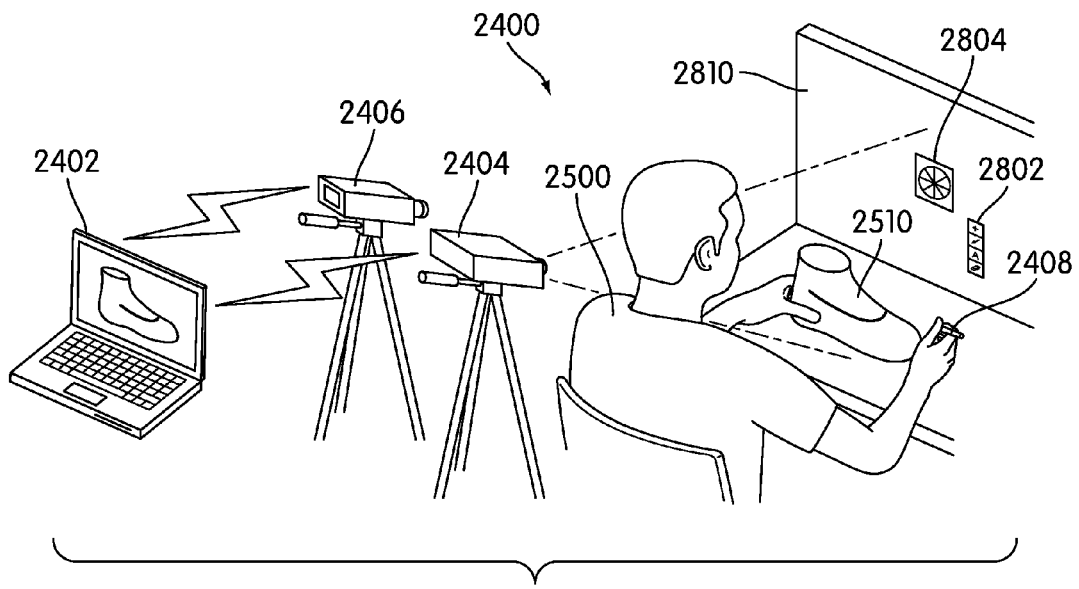
FIG. 28 is a schematic view of an embodiment of a design system used to design an article.
Figure 29:
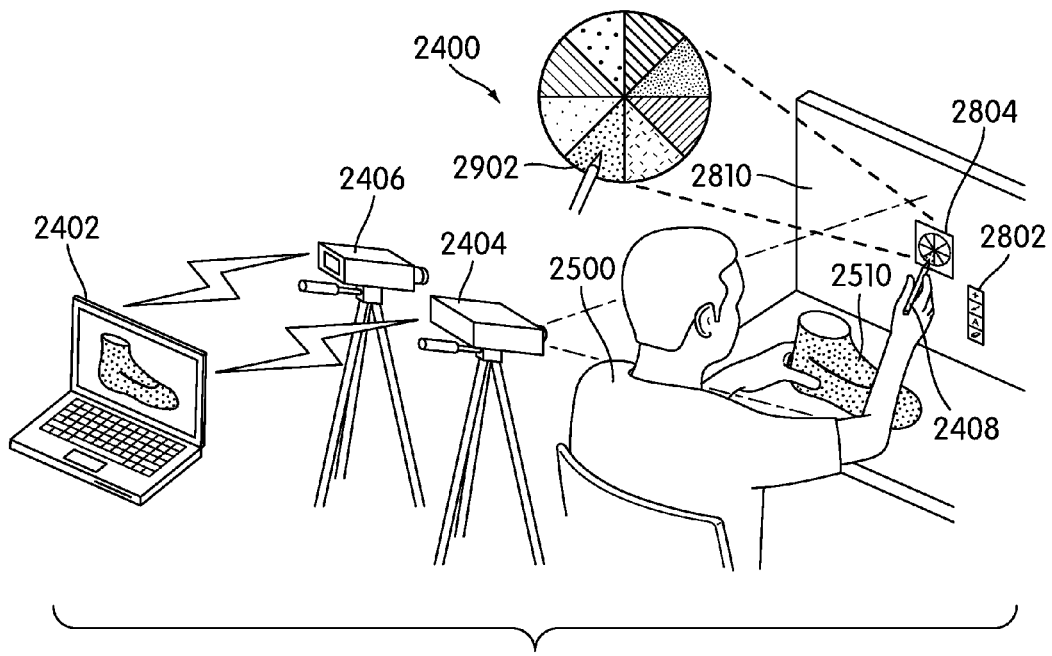
FIG. 29 is a schematic view of an embodiment of a design system used to design an article.

Referring to FIGS. 28 and 29, system 2400 can include tool palette 2802 and color palette 2804. In this case, tool palette 2802 and color palette 2804 are virtual palettes. Furthermore, tool palette 2802 and color palette 2804 may be projected onto surface 2810, so that tool palette 2802 and color palette 2804 are visible to user 2500.

Generally, system 2400 may be configured to project virtual menus onto any type of surface including, but not limited to: floors, walls, tables, as well as any other kind of surfaces. Moreover, in some cases, a design system could be configured with specially designed surfaces for receiving projected images of menus. In still other cases, menus could be projected directly onto a portion of a proxy. In the current embodiment, surface 2810 is wall portion of workbench 2560.

Referring to FIG. 29, user 2500 may change the color of proxy 2510 using color palette 2804. In particular, user 2500 may move interacting device 2408 to a portion of surface 2810 corresponding to color palette 2804. System 2400 may detect the position of interacting device 2408 and determine that interacting device 2408 is selecting a portion of color palette 2804 corresponding to color 2902.

An augmented reality design system can include provisions for displaying a combination of real-world images and virtual images on a stationary display device. For example, in one embodiment, virtual images may be combined with real-world images and displayed on a computer monitor or screen.

Figure 30:
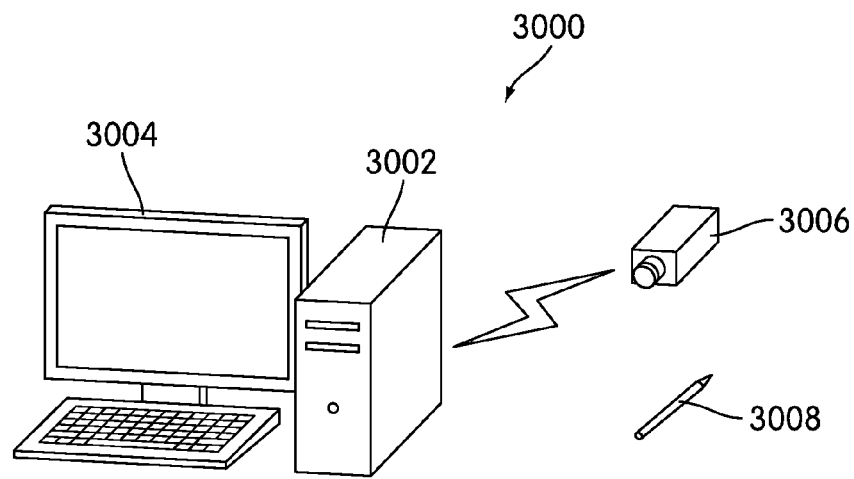
FIG. 30 is a schematic view of another embodiment of a design system.
Figure 31:
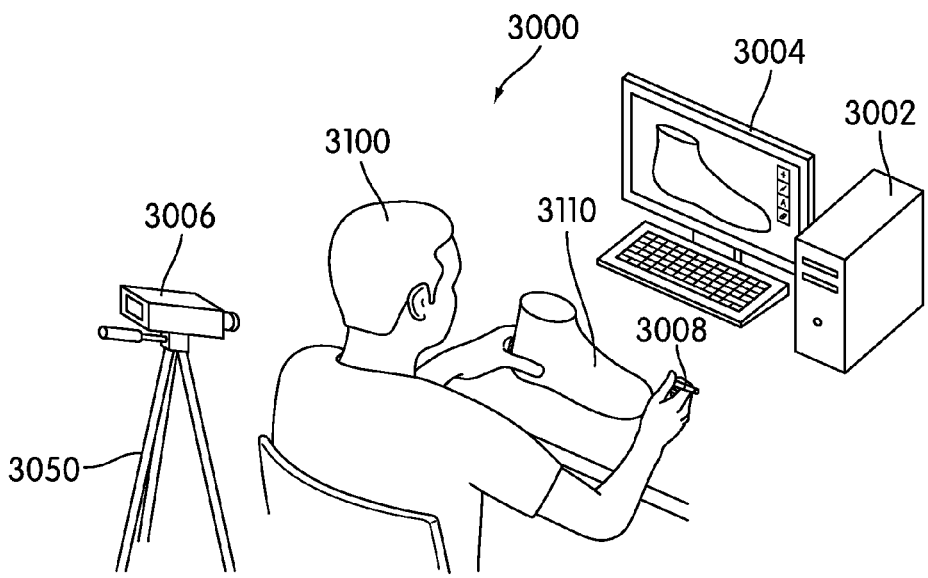
FIG. 31 is an isometric view of an embodiment of a design system being used to design an article.
Figure 32:
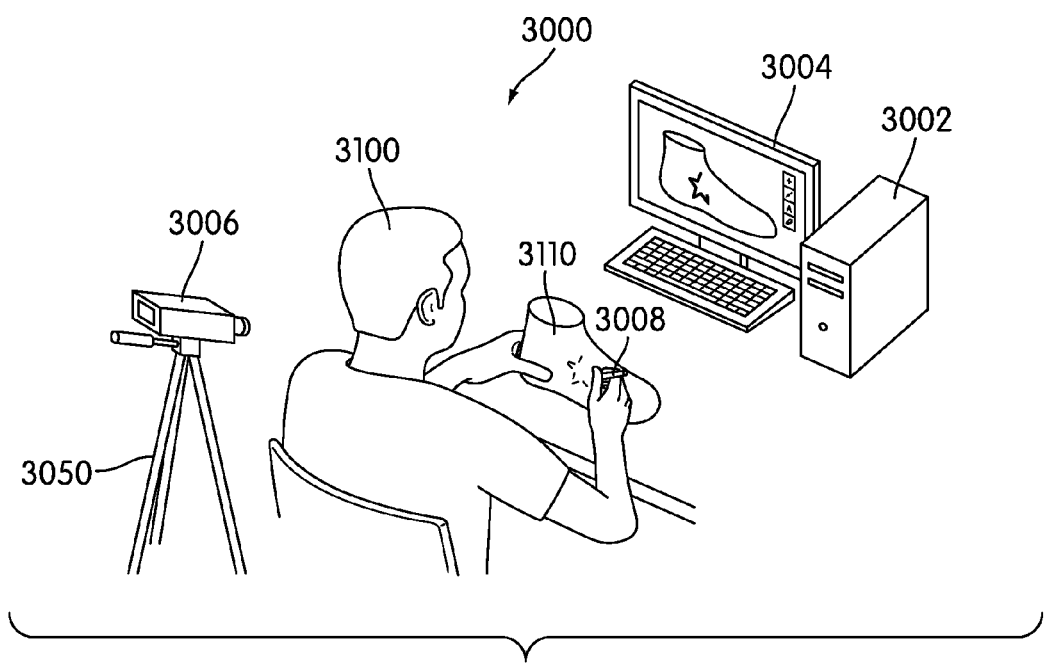
FIG. 32 is an isometric view of an embodiment of a design system being used to design an article.

FIGS. 30 through 32 illustrate an embodiment of augmented reality design system 3000, also referred to simply as system 3000. System 3000 can include one or more components. In one embodiment, system 3000 may include computing device 3002. Computing device 3002 may be any type of computer, including either a desktop or a laptop computer. In other embodiments, computing device 3002 may be any type of device that includes a display, a processor, and the ability to transmit and receive data from one or more external sources. Examples of such devices include, but are not limited to: PDA's, cell phones, as well as other types of devices.

System 3000 can include provisions for displaying an augmented reality image for a user. In some embodiments, system 3000 can include display device 3004. Display device 3004 can be any type of display including, but not limited to: a computer screen or monitor, a head mounted unit, a projection based display as well as any other kind of display. In the current embodiment, display device 3004 may comprise a computer monitor that is associated with computing device 3002.

System 3000 can include provisions for capturing visual information. In some embodiments, system 3000 can include imaging device 3006. Imagine device 3006 can be any device capable of sensing optical information. In some cases, imaging device 3006 can be a camera. In some cases, imaging device 3006 may be a video camera of some kind. Examples of different types of video cameras that could be used include charge coupled device (CCD) cameras, complementary metal-oxide-semiconductor (CMOS) cameras, other types of active pixel sensor cameras as well as any other type of video cameras.

Generally, imaging device 3006 can be disposed in any location with respect to various components of system 3000. In some cases, imaging device 3006 can be stationary. In other cases, imaging device 3006 can be mounted to another component of system 3000. In an exemplary embodiment, imaging device 3006 may mounted to a user in some way. For example, in one embodiment, imaging device 3006 may be mounted to a headset of some kind worn by the user. In other cases, however, imaging device 3006 may be disposed in a stationary location with respect to a user and/or a proxy. As an example, in the current embodiment, imaging device 3006 may be mounted to tripod 3050 (see FIG. 31). In still other embodiments, imaging device 3006 could be a webcam type camera that may be mounted to a portion of computing device 3002.

System 3000 can include provisions for interacting with an augmented reality environment. In some cases, system 3000 can include interacting device 3008. Interacting device 3008 may take any form. In some cases, interacting device 3008 could comprise a stylus. For example, interacting device 3008 could comprise a stylus similar to the kind used with personal digital assistants (PDAs), in which the stylus is a substantially monolithic component that is used for applying pressure to a display. In the current embodiment, interacting device 3008 is a substantially monolithic component with the approximate shape of a pen. In other cases, however, interacting device 3008 could have any other shape, size and composition.

In some embodiments, one or more components of system 3000 may communicate with computing device 3002. In some cases, imaging device 3006 may communicate with computing device 3002. Additionally, in some cases, display device 3004 may communicate with computing device 3002. Imaging device 3006 and display device 3004 could communicate with computing device 3002 using any type of wireless and/or wired connections. In some cases, imaging device 3006 and display device 3004 can communicate with computing device 3002 using a network of some kind. Examples of such networks include, but are not limited to: personal area networks, local area networks, wide area networks, client-server networks, peer-to-peer networks, as well as other types of networks. In some cases, a wireless local or personal area network using the Bluetooth® protocol is used to facilitate communication between computing device 3002 and imaging device 3006 and/or display device 3004. With this arrangement, images gathered from imaging device 3006 can be received by computing device 3002 and combined with virtual information. The combined information can then be transmitted back to display device 3004 to be displayed for a user. In particular, this allows system 3000 to augment the view of a user with one or more virtual objects or images.

Although the current embodiment uses a single imaging device, other embodiments could include two or more imaging devices. Moreover, it will be understood that in other embodiments any other kinds of sensors could be used with system 3000. An example of a system using additional kinds of sensors is discussed in detail below.

Although computing device 3002 is shown as a stand-alone computer in the current embodiment, in other embodiments, computing device 3002 could be integrate with other components of system 3000. For example, in another embodiment, computing device 3002 could be integrated with display device 3004. In particular, display device 3004 could include provisions for processing optical information received by imaging device 3006 as well as for generating virtual images to be displayed in display device 3004. In still other embodiments, computing device 3002 could be integrated with any other components of system 3000. In another example, computing device 3002 could be a portable device that may be worn or carried by a user to enhance the portability of system 3000. Furthermore, in some embodiments, computing device 3002 may not be located near various components of system 3000. For example, in another embodiment, imaging device 3006 and display device 3004 may communicate remotely with computing device 3002 using a network as discussed above.

Referring to FIGS. 31 and 32, user 3100 may create a design for an article using proxy 3110 with system 3000. It will be understood that system 3000 may provide substantially similar design tools and menus to the design tools and menus discussed with respect to the earlier embodiments. Moreover, in the current embodiment, user 3100 may view real-world images and virtual images on display device 3004. As user 3100 applies various virtual design elements to proxy 3110 using interacting device 3008, the appearance of proxy 3110 as seen on display device 3004 may be modified accordingly.

Although the previous embodiments include systems that utilize optical recognition software for purposes of tracking the motion and locations of a proxy and an interacting device, in other embodiments one or more components could be configured with additional sensors. In some cases, a design system could include a proxy with sensors or other devices configured to detect interactions with an interacting device. Likewise, in some cases, a design system could include an interacting device with one or more sensors for detecting interactions with a proxy. Moreover, in some cases, sensors and/or other devices in a proxy can be used to detect the location and/or orientation of the proxy. In a similar manner, a sensor in an interacting device can be used to detect the location and/or orientation of the interacting device. A computing device may then receive information from one or more sensors to determine where the user is pointing the interacting device with respect to the proxy. By using sensors, a design system may be capable of precisely calculating the relative locations and orientations of a proxy and an interacting device for purposes of applying one or more virtual design elements to the proxy.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of designing an article of apparel, the method comprising the steps of:
   viewing a proxy on a display device, the proxy existing in a real-world environment, the proxy including a detecting device that is configured to detect interactions between portions of the proxy with an interacting device, and the proxy having a shape of a mannequin;
   contacting the proxy in the real-world environment with the interacting device along a surface on the proxy to create a mark associated with a virtual design for the article of apparel, wherein the contacting has been detected by the detecting device;
   physically rotating, during the step of contacting, the proxy in the real-world environment while maintaining contact between the interacting device and the proxy during the rotation of the proxy;
   viewing, on the display device and during the step of physically rotating, a virtual line in the virtual design corresponding to the contacting of the proxy with the interacting device along the surface on the proxy during the step of physically rotating the proxy;
   wherein the virtual design is displayed on the display device so as to appear to be a part of the proxy; and
   wherein orientation and position of the virtual design is displayed on the display device so as to appear to be a part of the proxy as the proxy is rotated in the real-world environment.

2. The method according to claim 1, wherein the mannequin includes an upper portion that corresponds to a torso and arms, and wherein the step of viewing a virtual line includes viewing the virtual line on the upper portion.

3. The method according to claim 2 further comprising the step of placing a shirt onto the upper portion prior to the step of viewing a virtual line.

4. The method according to claim 2, wherein the article of apparel is a shirt.

5. The method according to claim 1, wherein the mannequin includes a lower portion that corresponds to a waist and legs, and wherein the step of viewing a virtual line includes viewing the virtual line on the lower portion.

6. The method according to claim 5, wherein the article of apparel is a pair of pants.

7. The method according to claim 5 further comprising the step of placing a pair of pants onto the lower portion prior to the step of viewing a virtual line.

8. The method according to claim 1, wherein the mannequin includes an upper portion that corresponds to a torso and arms and a lower portion that corresponds to a waist and legs, and wherein the step of viewing a virtual line includes viewing the virtual line on both the upper portion and the lower portion.

9. The method according to claim 8, wherein the article of apparel is an article that extends over both the upper portion and the lower portion.

10. A method of designing an article of apparel, the method comprising the steps of:
    viewing a proxy on a display device, the proxy existing in a real-world environment, the proxy including sensors that are configured to detect interactions between portions of the proxy and an interacting device, and the proxy having a shape of a full length mannequin having an upper portion and a lower portion;
    contacting the proxy in the real-world environment with the interacting device along a surface on the proxy to create a virtual design element for the article of apparel, wherein the contacting has been detected by a sensor of the sensors disposed in the proxy;
    physically rotating, during the step of contacting, the proxy in the real-world environment while maintaining contact between the interacting device and the proxy during the rotation of the proxy;
    viewing, on the display device and during the step of physically rotating, a virtual image of the virtual design element corresponding to the contacting of the proxy with the interacting device along the surface on the proxy during the step of physically rotating the proxy;
    wherein the virtual design is displayed on the display device so as to appear to be a part of the proxy, wherein the virtual design extends over both the upper portion and the lower portion of the proxy; and
    wherein orientation and position of the virtual design is displayed on the display device so as to appear to be a part of the proxy as the proxy is rotated in the real-world environment.

11. The method according to claim 10 further comprising the step of adapting the virtual design element to a boundary marking disposed on the proxy.

12. The method according to claim 11 further comprising the step of virtually applying the boundary marking to the proxy.

13. The method according to claim 11 further comprising the step of placing an article of clothing directly onto the proxy, wherein the article of clothing establishes the boundary marking.

14. The method according to claim 11, wherein the proxy includes the boundary marking.

15. An augmented reality design system for designing an article of apparel, the system comprising:
    an imaging device for receiving images from a real-world environment;
    a proxy existing in the real world environment, the proxy being a mannequin, and the proxy including a detecting device, wherein the detecting device includes a plurality of sensors in the proxy, wherein the sensors substantially cover a surface of the proxy;
    an interacting device for interacting with the proxy in the real world environment, wherein the detecting device of the proxy is capable of detecting interactions between portions of the proxy with the interacting device;
    a computing device capable of generating virtual images, at least one of the virtual images being based on at least one detection of a contact point by the detecting device of the proxy;

a display device, wherein the at least one virtual image is superimposed onto an image of the proxy received by the imaging device;

a virtual menu that may be displayed on the display device, wherein the virtual menu is associated with a location in the real world environment and wherein a user can interact with the virtual menu by placing the interacting device in the location;

wherein the virtual menu can be used to apply a virtual design element to the proxy at a location on the proxy corresponding with a contact point of the interacting device with the proxy in the real world environment; and wherein the detecting device detects the location on the proxy corresponding with the contact point of the interacting device with a surface of the proxy in the real-world environment.

16. The augmented reality design system according to claim 15, wherein the mannequin includes an upper portion in the shape of a torso and arms and a lower portion in the shape of a waist and legs.

17. The augmented reality design system according to claim 16, wherein the virtual design element extends from the upper portion to the lower portion.

18. The augmented reality design system according to claim 15, wherein the proxy includes boundary markings.

* * * * *